(12) United States Patent
Jansen et al.

(10) Patent No.: US 11,390,023 B2
(45) Date of Patent: Jul. 19, 2022

(54) METHODS AND COMPOSITIONS FOR FORMING THREE-DIMENSIONAL OBJECTS BY ADDITIVE FABRICATION

(71) Applicant: Covestro (Netherlands) B.V., Nieuwegein (NL)

(72) Inventors: Johan Franz Gradus Antonius Jansen, Echt (NL); Rudolfus Antonius Theodorus Maria Van Benthem, Echt (NL); Paulus Franciscus Anna Buijsen, Echt (NL); Franciscus Johannes Marie Derks, Echt (NL); Mark Petrus Franciscus Pepels, Echt (NL); Alfred Jean Paul Buckmann, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 0 days.

(21) Appl. No.: 17/216,755

(22) Filed: Mar. 30, 2021

(65) Prior Publication Data

US 2021/0213679 A1    Jul. 15, 2021

Related U.S. Application Data

(63) Continuation of application No. 16/318,754, filed as application No. PCT/EP2017/068521 on Jul. 21, 2017, now Pat. No. 10,994,479.

(30) Foreign Application Priority Data

Jul. 22, 2016  (EP) ..................................... 16180915
Oct. 28, 2016  (EP) ..................................... 16196328
Apr. 21, 2017  (EP) ..................................... 17167544

(51) Int. Cl.
C08F 290/06     (2006.01)
B33Y 70/00      (2020.01)
C08F 220/18     (2006.01)
C08F 216/12     (2006.01)
C08K 5/14       (2006.01)
C08K 5/17       (2006.01)
C08L 67/06      (2006.01)
C08L 75/14      (2006.01)
B29C 64/165     (2017.01)
B33Y 10/00      (2015.01)
C08G 18/75      (2006.01)
C08G 18/22      (2006.01)
C08G 18/73      (2006.01)
C08G 18/80      (2006.01)
C08G 18/32      (2006.01)
C08G 18/42      (2006.01)
C08G 18/67      (2006.01)
B29C 64/393     (2017.01)
B29C 64/291     (2017.01)
C08K 3/013      (2018.01)
C08F 2/48       (2006.01)
C08L 75/02      (2006.01)
B33Y 50/02      (2015.01)

(52) U.S. Cl.
CPC .......... B29C 64/165 (2017.08); B29C 64/291 (2017.08); B29C 64/393 (2017.08); B33Y 10/00 (2014.12); B33Y 70/00 (2014.12); C08F 2/48 (2013.01); C08F 216/125 (2013.01); C08F 220/1811 (2020.02); C08F 290/06 (2013.01); C08F 290/061 (2013.01); C08G 18/227 (2013.01); C08G 18/3206 (2013.01); C08G 18/4211 (2013.01); C08G 18/672 (2013.01); C08G 18/73 (2013.01); C08G 18/755 (2013.01); C08G 18/8016 (2013.01); C08K 3/013 (2018.01); C08K 5/14 (2013.01); C08K 5/17 (2013.01); C08L 67/06 (2013.01); C08L 75/02 (2013.01); C08L 75/14 (2013.01); B33Y 50/02 (2014.12)

(58) Field of Classification Search
CPC ....... B29C 64/165; B33Y 70/00; C08K 3/013; C08K 5/14; C08K 5/17; C08F 216/125; C08F 220/18; C08F 290/061; C08L 67/06; C08L 75/14

See application file for complete search history.

(56) References Cited

U.S. PATENT DOCUMENTS

| | | | | |
|---|---|---|---|---|
| 2005/0093194 A1* | 5/2005 | Oriakhi | ................ | B33Y 70/00 428/323 |
| 2011/0262637 A1* | 10/2011 | Jansen | ................ | C09D 5/033 264/141 |
| 2012/0231232 A1* | 9/2012 | Xu | ................ | C08F 290/067 524/502 |

FOREIGN PATENT DOCUMENTS

CN       1503721      *  6/2004
WO     WO03016030     *  2/2003

* cited by examiner

*Primary Examiner* — Mary Lynn F Theisen
(74) *Attorney, Agent, or Firm* — Jed C. Benson

(57) ABSTRACT

A method of forming a three-dimensional object comprises the steps of forming a layer of a particulate composition, selectively depositing a liquid composition onto the layer of the particulate composition in accordance with computer data corresponding to the shape of at least a portion of a three-dimensional object, initiating polymerization, and repeating the steps a plurality of times to form a three-dimensional object. The particulate composition comprises a plurality of first particles that comprise a resin component comprising a first resin, the first resin comprising a first resin polymerizable group, the first resin polymerizable group comprising a carbon-carbon double bond directly attached to an electron withdrawing group, a thermal radical initiator dispersed or dissolved in the resin component, and a retardant dispersed or dissolved in the resin component.

20 Claims, No Drawings

METHODS AND COMPOSITIONS FOR FORMING THREE-DIMENSIONAL OBJECTS BY ADDITIVE FABRICATION

CROSS-REFERENCE TO RELATED APPLICATIONS

This application is a continuation of U.S. application Ser. No. 16/318,754, which issued as U.S. Pat. No. 10,994,479, and which itself was the U.S. national phase of International Application No. PCT/EP2017/068521, filed 21 Jul. 2017, which designated the EP and claims priority to the following EP Application No.'s: 16180915.7, filed 22 Jul. 2016; 16196328.5, filed Oct. 28, 2016; and 17167544.0, filed Apr. 21, 2017. The entirety of the contents of each of these applications is hereby incorporated by reference as if fully set forth herein.

FIELD

The invention relates to a method of forming three-dimensional objects by additive fabrication, to compositions and kits of materials that may be useful for forming three-dimensional objects by additive fabrication, and to three-dimensional objects formed by additive fabrication.

BACKGROUND

Additive fabrication, also known as three-dimensional printing, is a technique for forming three-dimensional objects by building up objects one portion at a time until a final three-dimensional object is produced. Additive techniques can be contrasted with subtractive techniques, such as milling, wherein portions of material are removed from a larger amount of material to produce the final three-dimensional object.

One known additive fabrication technique is disclosed in U.S. Pat. No. 5,204,055. In this technique, a layer of a powder material is formed. A liquid binder is then deposited onto a layer of a powder material in selected regions in accordance with computer data corresponding to the shape of at least a portion of a three-dimensional object. The liquid binder causes the powder material to become bonded in the selected regions. The steps of forming layers of powder material and depositing the liquid binder in selected regions of the layer of powder material are repeated a selected number of times to produce a three-dimensional object. The powder may be solid or porous and may be a ceramic, metallic, or plastic material.

Further techniques based on the process of U.S. Pat. No. 5,204,055 have focused on the chemical reaction involved in curing the binder material, and in some cases have involved chemical reactions of the powder material itself. For example, US20040036200 mentions a system wherein the powder substantially comprises a first reactive component and the liquid binder includes a second active component, the second active component being capable of either reacting with the first reactive component or facilitating the first reactive component to react with itself.

A further such system is described in U.S. Pat. No. 7,381,360. In such a system, a particulate composition is utilized as the powder material. The particulate composition contains polymeric particulates, a polymerization initiator, and optionally other particulate components. The liquid binder comprises polymerizable monomers and a polymerization accelerator. The polymerization accelerator is typically present to react with the polymerization initiator of the particulate composition.

Despite these advances, there is a need for further and alternative methods for forming three-dimensional objects by additive fabrication.

SUMMARY

In an embodiment of the invention, a method of forming a three-dimensional object comprises the steps of:
  a. forming a layer of a particulate composition, the particulate composition comprising a plurality of first particles that comprise:
    i. a resin component comprising a first resin, the first resin comprising a first resin polymerizable group, the first resin polymerizable group comprising a carbon-carbon double bond directly attached to an electron withdrawing group,
    ii. a thermal radical initiator dispersed or dissolved in the resin component, and
    iii. a retardant dispersed or dissolved in the resin component;
  b. selectively depositing a liquid composition onto the layer of the particulate composition in accordance with computer data corresponding to the shape of at least a portion of a three-dimensional object, the liquid composition comprising:
    i. a first liquid polymerizable component, the first liquid polymerizable component comprising a first liquid polymerizable group, the first liquid polymerizable group comprising a carbon-carbon double bond that is able to (co)polymerize with the first resin polymerizable group;
  c. optionally applying electromagnetic radiation to a plurality of the locations of the layer of the particulate composition where the liquid composition has been selectively deposited;
  d. activating the thermal radical initiator in a plurality of the locations of the layer of the particulate composition where the liquid composition has been selectively deposited; and
  e. repeating steps a-d a plurality of times to form a three-dimensional object.

Dispersing or dissolving the thermal radical initiator and the retardant in the resin component may have various benefits in stability, safety, processing, cure speed, or properties of the three-dimensional objects formed.

The liquid composition may further comprise an accelerator and/or an absorber. In an embodiment, the liquid composition further comprises an accelerator for the thermal radical initiator, wherein when the accelerator comes in contact with the thermal radical initiator, the thermal radical initiator is able to generate radicals at a temperature that is lower than the temperature at which the thermal radical initiator is able to generate radicals in the absence of the accelerator. In an embodiment, the liquid composition further comprises an absorber, the absorber being able to absorb electromagnetic radiation.

DETAILED DESCRIPTION

Generally, a layer of a three-dimensional object may be formed by a process comprising the steps of forming a layer of a particulate composition and selectively depositing a liquid composition onto the layer of the particulate composition in accordance with computer data corresponding to the shape of at least a portion of a three-dimensional object. The process can be repeated additional times to form further layers, eventually building up the desired three-dimensional object. Optionally, electromagnetic radiation can be applied to aid in the curing of each layer. Post treatment steps, such as treatment with temperature or light, may also be present.

In accordance with an embodiment of the invention, a method of forming a three-dimensional object comprises the steps of:
 a. forming a layer of a particulate composition, the particulate composition comprising a plurality of first particles that comprise:
   i. a resin component comprising a first resin, the first resin comprising a first resin polymerizable group, the first resin polymerizable group comprising a carbon-carbon double bond directly attached to an electron withdrawing group,
   ii. a thermal radical initiator dispersed or dissolved in the resin component, and
   iii. a retardant dispersed or dissolved in the resin component;
 b. selectively depositing a liquid composition onto the layer of the particulate composition in accordance with computer data corresponding to the shape of at least a portion of a three-dimensional object, the liquid composition comprising:
   i. a first liquid polymerizable component, the first liquid polymerizable component comprising a first liquid polymerizable group, the first liquid polymerizable group comprising a carbon-carbon double bond that is able to (co)polymerize with the first resin polymerizable group;
 c. optionally applying electromagnetic radiation to a plurality of the locations of the layer of the particulate composition where the liquid composition has been selectively deposited;
 d. activating the thermal radical initiator in a plurality of the locations of the layer of the particulate composition where the liquid composition has been selectively deposited; and
 e. repeating steps a-d a plurality of times to form a three-dimensional object.

The step of forming a layer of a particulate composition can be formed by simply smoothing a quantity of a particulate composition into a sufficiently level plane. This can be done by smoothing the top plane of a large quantity of particulate composition, or pushing a layer of particulate composition across a previously cured layer of the desired three-dimensional object being formed. The plane has a surface, which is the interface of the particulate composition and a gas, such as air or nitrogen, or the equivalent location if under vacuum. The powder is flowable when forming a layer of particulate composition. The step of forming a layer of a particulate composition can be performed by use of a doctor blade or a roller. In another process, the particulate composition could be dispensed onto a substrate in order to form a layer of the particulate composition.

The particulate composition may have a dry temperature, the dry temperature being the temperature at the surface of the layer of the particulate composition. The temperature at the surface is the temperature prior to contacting the particulate composition and the liquid composition. The dry temperature is typically the environment temperature of the additive fabrication process. In an embodiment, the average temperature of the air or other gas, such as nitrogen, at the surface of the particulate composition is equal to the dry temperature. The dry temperature may be maintained using appropriate heating, cooling, or ventilation devices.

After forming a layer of the particulate composition, a liquid composition is selectively deposited onto the layer of the particulate composition in accordance with computer data corresponding to the shape of at least a portion of a three-dimensional object. In an embodiment, the liquid composition comprises a first liquid polymerizable component, and the first liquid polymerizable component comprises a first liquid polymerizable group.

The liquid composition may be selectively deposited at an amount of at least 1 wt %, 5 wt %, 10 wt %, 15 wt %, 20 wt %, 25 wt %, 30 wt %, 35 wt %, or 40 wt % of liquid composition per voxel, based on the total weight of the particulate composition and the liquid composition per voxel. The liquid composition may be selectively deposited at an amount of at most 90 wt %, 80 wt %, 75 wt %, 70 wt %, 65 wt %, or 60 wt % of liquid composition per voxel, based on the total weight of the particulate composition and the liquid composition per voxel.

Throughout this patent application, melting temperature is defined as the peak temperature of a melting peak in a DSC thermogram. Melting temperature is synonymous with melting point.

A melting enthalpy associated with a melting temperature is determined as follows. A melting enthalpy is assigned to each melting temperature by defining the minimum melting enthalpies between each melting temperature, and then assigning the total melting enthalpy between the minimums to the melting temperature that falls between those two minimums. The sum of the melting enthalpy assigned to each melting temperature equals the total melting enthalpy of the DSC thermogram.

After selectively depositing the liquid composition, electromagnetic radiation may be optionally applied to a plurality of the locations of the layer of the particulate composition where the liquid composition has been selectively deposited. In an embodiment, after selectively depositing the liquid composition, electromagnetic radiation is applied to substantially all of the locations of the layer of the particulate composition where the liquid composition has been selectively deposited. In an embodiment, after selectively depositing the liquid composition, electromagnetic radiation is applied to all of the locations of the layer of the particulate composition where the liquid composition has been selectively deposited. The electromagnetic radiation may comprise, for instance, heat, such as infrared radiation, or light, such as visible or UVA radiation. In an embodiment, the electromagnetic radiation comprises infrared light. In an embodiment, the electromagnetic radiation comprises UV light. In an embodiment, the electromagnetic radiation comprises electromagnetic radiation having a wavelength of from 340 to 415 nm. In an embodiment, the electromagnetic radiation comprises electromagnetic radiation having a wavelength of from 700 to 1500 nm.

The electromagnetic radiation may be applied using any suitable apparatus such as a lamp, a laser, or LEDs. The electromagnetic radiation may be applied to the entire layer of the particulate composition, to only those parts of the particulate composition where liquid composition was selectively deposited, or some combination of the two.

Activating the thermal radical initiator in a plurality of the locations of the layer of the particulate composition where the liquid composition has been selectively deposited initiates polymerization of at least the first resin and the first liquid polymerizable component in at least a plurality of the locations where the liquid composition has been selectively deposited. The thermal radical initiator generates sufficient radicals to initiate polymerization of the first resin within two hours when the thermal radical initiator is exposed to a temperature greater than or equal to an activation temperature, the activation temperature being greater than 30° C. The activation temperature may be optionally lowered by contacting the thermal radical initiator with an accelerator.

In an embodiment, the thermal radical initiator is activated by temporarily increasing the local temperature to the activation temperature or higher by the application of electromagnetic radiation to a plurality of the locations of the layer of the particulate composition where the liquid composition has been selectively deposited. In an embodiment, electromagnetic radiation is applied selectively to a plurality of the locations of the layer of the particulate composition where the liquid composition has been selectively deposited. In an embodiment, the liquid composition may further comprise an absorber to facilitate the increase of the local temperature where electromagnetic radiation is applied. In an embodiment, the thermal radical initiator is activated as a result of the performance of step c.

In an embodiment, the thermal radical initiator is activated by means of an accelerator present in the liquid composition, such that when the liquid composition contacts the particulate composition the activation temperature of the thermal radical initiator is reduced to be lower than the dry temperature, thereby causing activation of the thermal radical initiator and initiation of polymerization of at least the first resin and the first liquid polymerizable component. In an embodiment, the thermal radical initiator is activated as a result of selectively depositing an accelerator and the selection of the appropriate dry temperature.

In an embodiment, the method further comprises melting the first resin in a plurality of locations of the layer of the particulate composition where the liquid composition has been selectively deposited. In an embodiment, the melting occurs prior to the activation of the thermal radical initiator. In an embodiment, the melting occurs contemporaneously with the activation of the thermal radical initiator. In an embodiment, the first resin melts at a temperature that is less than or equal to the dry temperature when the particulate composition is in contact with the liquid composition, but does not melt at the dry temperature when the particulate composition is not in contact with the liquid composition. In an embodiment, melting is accomplished by use of a first resin that is crystalline or semi-crystalline such that the melting point(s) of the first resin are reduced when the first resin comes into contact with the liquid composition. In an embodiment, melting is accomplished by increasing the local temperature at a plurality of the locations of the layer of the particulate composition where the liquid composition has been selectively deposited by applying electromagnetic radiation.

The process is repeated additional times, thereby forming numerous layers in accordance with the shape of a three-dimensional object. A fresh layer of particulate composition is formed adjacent to the just-cured layer.

The three-dimensional object may be further subjected to post-curing. In an embodiment, the three-dimensional object is post-cured by applying electromagnetic radiation to the three-dimensional object. In an embodiment, the electromagnetic radiation comprises infrared radiation. In an embodiment, the electromagnetic radiation comprises ultraviolet radiation. In an embodiment, the post-cure comprises a thermal post-cure. In an embodiment, the post-cure comprises a thermal post-cure at a temperature that is greater than or equal to the highest melting temperature in the particulate composition. In an embodiment, the post-cure comprises a thermal post-cure at a temperature that is higher than all melting temperatures of the first resin, all resins in the particulate composition, the first particles, or the particulate composition when the particulate composition is not in contact with the liquid composition. In an embodiment, the post-cure lasts for at least 15, 30, 45, 60, 75, 90, 105, or 120 minutes.

In an embodiment, the post-cure comprises a post-cure at a temperature that is higher than the dry temperature and higher than at least one melting temperature of the first resin, the resin component, all crystalline or semi-crystalline resins in the particulate composition, all resins in the particulate composition, the first particles, or the particulate composition when the particulate composition is in contact with the liquid composition, the at least one melting temperature being higher than the dry temperature. In an embodiment, the post-cure comprises a post-cure at a temperature that is higher than the dry temperature and greater than or equal to the activation temperature of a thermal initiator.

The components of the particulate composition and liquid composition, and further optional components, and further aspects of the methods and kits of materials, are discussed further below.

Particulate Composition

The particulate composition may comprise one or more different kinds of particles, for instance, particles having different chemical makeup. A plurality of the particles are first particles that comprise a resin component, a thermal radical initiator dispersed or dissolved in the resin component, and a retardant dispersed or dissolved in the resin component. Such first particles are typically present at an amount of from 40 to 100 wt % of the particulate composition, for example from 50 wt % to 99 wt % of the particulate composition.

Additional potential components of the particulate composition are flow modifiers, non-reactive fillers, stabilizers, or further additives such as colorants. In an embodiment, the particulate composition comprises a colorant and the colorant comprises a pigment or a dye.

In an embodiment, the particulate composition comprises a flow modifier. Suitable flow modifiers are fumed silicon dioxide, precipitated silicon dioxide, fumed aluminum oxide, talc, or fumed titanium dioxide. The flow modifier can be simply mixed in with the other elements of the particulate composition. In an embodiment, the particulate composition comprises from 0.05 to 5 wt % of flow modifier, based on the total weight of the particulate composition.

In an embodiment, the particulate composition comprises a plurality of particles that are filler. Such fillers may be organic or inorganic. In an embodiment, the filler is non-reactive with the other components of the particulate composition and the liquid composition. In an embodiment, the filler is reactive with at least one other component of the particulate composition or a component in the liquid composition. In the case that an organic filler comprises reactive groups, the organic filler has a Mn divided by the average number of polymerizable groups per molecule of greater than 3000 g/mol and all resins in the particulate composition have a Mn divided by the average number of polymerizable groups per molecule of less than 3000 g/mol.

In an embodiment, all resins in the particulate composition have a Mn divided by the average number of polymerizable groups per molecule of less than 3000 g/mol.

In an embodiment, the particulate composition further comprises a plurality of particles of silicon dioxide, titanium dioxide, calcium carbonate, magnesium carbonate, barium sulphate, calcium sulphate, zeolite, graphite, carbon black, carbon fiber, carbon nanotubes, alumina, or alumina hydrate. In an embodiment, the particulate composition further comprises a plurality of metal particles.

In an embodiment, the particulate composition comprises an organic filler, such as polyurethane particles, polystyrene particles, poly(methyl methacrylate) particles, polycarbonate particles, or core-shell particles. In an embodiment, the organic filler comprises an impact modifier. Examples of impact modifiers are elastomer particles. In an embodiment, the impact modifying components, which can be dispersed into the composition, are elastomers based on copolymers of ethylene or propylene and one or more $C_2$ to $C_{12}$ α-olefin monomers.

Examples of such are ethylene/propylene copolymers or ethylene/propylene copolymers, optionally containing a third copolymerizable diene monomer (EPDM), such as 1,4-hexadiene, dicyclopentadiene, di-cyclooctadiene, methylene norbornene, ethylidene norbornene and tetrahydroindene; ethylene/α-olefin copolymers, such as ethylene-octene copolymers and ethylene/α-olefin/polyene copolymers.

In an embodiment, the particulate filler comprises polybutadiene, polyisoprene, styrene/butadiene random copolymer, styrene/isoprene random copolymer, acrylic rubbers (e.g. polybutylacrylate), poly(hexamethylene carbonate).

Elastomer particles may be prepared by a variety of means, including by isolation from a latex made via emulsion polymerization. The average size of these elastomer particles is preferably between about 10 nm and about 10 μm. In an embodiment, the average size of the elastomer particles if from 10 nm to 1 μm.

Optionally, a shell may be present on the particles that can be introduced, e.g., via grafting or during a second stage of emulsion polymerization. Examples of such particles are core-shell impact modifier particles that contain a rubber core and a glassy shell. Examples of core materials are polybutadiene, polyisoprene, acrylic rubber (e.g. polybutylacrylate rubber), styrene/butadiene random copolymer, styrene/isoprene random copolymer, or polysiloxane. Examples of shell materials or graft copolymers are (co) polymers of vinyl aromatic compounds (e.g. styrene) and vinyl cyanides (e.g. acrylonitrile) or (meth)acrylates (e.g. MMA).

Commercially available products of these core-shell type elastomer particles are Resinous Bond RKB (dispersions of core-shell particles in epoxy manufactured by Resinous Chemical Industries Co., Ltd.), Durastrength D400, Durastrength 400R (manufactured by Arkema Group), Paraloid EXL-2300 (non-functional shell), Paraloid EXL-2314 (epoxy functional shell), Paraloid EXL-2600, Paraloid EXL-3387 and Paraloid KM-365 (manufactured by Dow), Genioperl P53, Genioperl P23, Genioperl P22 (manufactured by Wacker Chemical), Kane Ace MX products (manufactured by Kaneka), and the like.

Other examples of such elastomer particles are cross-linked polyorganosiloxane rubbers that may include dialkylsiloxane repeating units, where "alkyl" is $C_1$-$C_6$ alkyl. The particles may be modified to include reactive groups, preferably on the surface of the particles.

Examples of polyorganosiloxane elastomer particles that are commercially available are Albidur EP 2240(A), Albidur EP 2640, Albidur VE 3320, Albidur EP 5340, Albidur EP 5640, and Albiflex 296 (dispersions of particles in epoxy or vinyl ether resins, Hanse Chemie, Germany), Genioperl M41C (dispersion in epoxy, Wacker Chemical), Chemisnow MX Series and MP Series (Soken Chemical and Engineering Co.).

Optionally, the filler may be modified to contain reactive groups that (co)polymerize with a component in the particulate composition or the liquid composition. This modification can be introduced by reactive grafting or by copolymerization. Commercial examples of the latter are Lotader random ethylene/acrylate copolymers AX8840 (glycidyl methacrylate/GMA modified), AX8900 and AX8930 (GMA and maleic anhydride modified/MA) produced by Arkema. Optionally, polymerizable groups can be incorporated into the shell of a core-shell particle by copolymerization, such as copolymerization with glycidyl methacrylate, or by treatment of the shell to form reactive functional groups.

In an embodiment, the particulate composition comprises from 1 to 50 wt % of a filler, based on the total weight of the particulate composition. In an embodiment, the particulate composition comprises from 10 to 35 wt % of a filler, based on the total weight of the particulate composition.

In an embodiment, the particulate composition comprises a stabilizer. In an embodiment, the particulate composition comprises a flame retardant, anti-oxidant, hindered amine light stabilizer, and/or UV absorber. The stabilizer may be present as a particulate itself, or dispersed or dissolved in another component, such as in the resin component.

In an embodiment, the particulate composition comprises a plurality of second particles. In an embodiment, the particulate composition further comprises a plurality of second particles that comprise a further resin component that may be the same or different from the resin component of the first particles and is able to (co)polymerizable with the first resin, and optionally a further initiator, such as a further thermal radical initiator, for initiating polymerization of the further resin component. In an embodiment, the particulate composition further comprises a plurality of second particles that comprise a further resin component that is different from the resin component and not able to (co)polymerizable with the resin component, and optionally a further initiator, such as a thermal initiator dispersed or dissolved in the further resin component, for initiating polymerization of the further resin component.

In an embodiment, the first or second particles further comprise a non-reactive polymer having a number average molecular weight of 1000 to 20,000 g/mol. In an embodiment, the non-reactive polymer is poly(methyl methacrylate), poly(ethyl methacrylate), polyamide, poly(ethylene terephthalate), polyethylene, polypropylene, or copolymers thereof.

Further potential components of the particulate composition are additives such as dyes, pigments for coloration, or pigments for infrared absorption. Such additives may be present as a particulate itself, or dispersed or dissolved in another component, such as in the resin component.

In order to form particles, a premix may be formed that comprises the components of a plurality of the particles making up the particulate composition. For example, a premix may comprise a resin component, a thermal radical initiator, and a retardant. The premix components may be separately weighed and combined in a premixer and a premix formed. A solvent treatment, extrusion, or kneading may be needed to appropriately mix the premix components. For example, the premix may be heated, for example in a kneader or in an extruder, and an extrudate obtained.

The extrudate may then be cooled down until it solidifies, and then ground into particles. The particles may be further ground to reduce the particle size further, followed by appropriate classification based on size to obtain a plurality of particles at the desired particle size.

The mixing temperature, duration of mixing, and retardant content may be chosen so as to avoid significant unwanted polymerization during the preparation of the particles. If the premix is heated in an extruder, it is preferred to use a suitable temperature control in order to avoid reaching a temperature that could lead to curing of the resin component in the extruder.

In an embodiment, the plurality of first particles have a mean particle diameter of from 10 to 100 μm. In an embodiment, the plurality of first particles have a mean particle diameter of from 30 to 80 μm. The elements of the first particles are described further below.

A plurality of the particles are first particles that comprise a resin component, a thermal radical initiator dispersed or dissolved in the resin component, and a retardant dispersed or dissolved in the resin component.

Resin Component

The first particles comprise a resin component. The resin component may comprise multiple resins, such as a first resin, a second resin, etc. The resin component comprises at least a first resin, the first resin comprising a first resin polymerizable group. The first resin polymerizable group comprises a carbon-carbon double bond directly attached to an electron withdrawing group. Although only the first resin will be referred to below, the description of the first resin is intended to also describe potential aspects of the optional second or further resin.

In an embodiment, the resin component comprises a polyester, acrylic, polyurethane, epoxy, polyamide, polyesteramide, polycarbonates, polyureas, or a mixture thereof. In an embodiment, the first resin is a polyester, acrylic, polyurethane, epoxy, polyamide, polyesteramide, polycarbonates, polyureas, or a mixture thereof.

In an embodiment, the first resin has a melting temperature ($T_m$) of at least 30, at least 40, at least 50, or at least 60° C. In an embodiment, the first resin has a melting temperature ($T_m$) of at most 250, at most 200, at most 180, at most 160, at most 140, at most 130, at most 120, or at most 110° C. In an embodiment, the first resin has a melting temperature of from 50 to 120° C. In an embodiment, a crystalline or semi-crystalline resin has a melting enthalpy ($\Delta H_m$) of at least 38, at least 40, at least 50, or at least 60 J/g.

In an embodiment, the first resin has a glass transition temperature ($T_g$) of at least −70, at least −50, at least −40, at least −35, at least −20, at least −10, at least 0, at least 10, or at least 20° C. In an embodiment, the first resin has a glass transition temperature ($T_g$) of at most 120, at most 110, at most 100, at most 90, at most 80, at most 75, at most 70, at most 60, or at most 50° C.

The first resin comprises one or more first resin polymerizable groups. The first resin may comprise multiple polymerizable groups, such as an average of at least two polymerizable groups, at least three, at least four, at least five, or at least six polymerizable groups. The first resin may be linear or branched. In an embodiment, the average number of first resin polymerizable groups in each molecule of the first resin is at least 1, at least 1.5, at least 2, equal to 2, at least 2.01, at least 2.05, at least 2.10, at least 2.12, at least 2.15, at least 2.20, at least 2.30, at least 2.35, or at least 2.40. In an embodiment, the average number of first resin polymerizable groups in each molecule of the first resin is at most 10, at most 9, at most 8, at most 7, at most 6, at most 5, at most 5.5, at most 5, at most 4.5, at most 4, at most 3.80, or at most 3.50.

In an embodiment, the average number of first resin polymerizable groups in each molecule of the first resin is at least 2 and at most 4.5, at least 2 and at most 4, at least 2 and at most 3.5, or at least 2 and at most 3.

At least one first resin polymerizable group comprises a carbon-carbon double bond directly attached to an electron withdrawing group. In an embodiment, the first resin polymerizable group consists of a carbon-carbon double bond directly attached to an electron withdrawing group.

The first resin comprises one or more carbon-carbon double bonds directly attached to an electron withdrawing group. The first resin may comprise multiple carbon-carbon double bonds directly attached to an electron withdrawing group, such as an average of at least two carbon-carbon double bonds directly attached to an electron withdrawing group, at least three, at least four, at least five, or at least six carbon-carbon double bonds directly attached to an electron withdrawing group. The first resin may be linear or branched. In an embodiment, the average number of carbon-carbon double bonds directly attached to an electron withdrawing group in in each molecule of the first resin is at least 1, at least 1.5, at least 2, equal to 2, at least 2.01, at least 2.05, at least 2.10, at least 2.12, at least 2.15, at least 2.20, at least 2.30, at least 2.35, or at least 2.40. In an embodiment, the average number of carbon-carbon double bonds directly attached to an electron withdrawing group in each molecule of the first resin is at most 10, at most 9, at most 8, at most 7, at most 6, at most 5, at most 5.5, at most 5, at most 4.5, at most 4, at most 3.80, or at most 3.50.

In an embodiment, the average number of carbon-carbon double bonds directly attached to an electron withdrawing group in each molecule of the first resin is at least 2 and at most 4.5, at least 2 and at most 4, at least 2 and at most 3.5, or at least 2 and at most 3.

In an embodiment, the first resin is telechelic. A telechelic resin is a resin comprising at least two reactive endgroups. In an embodiment, the first resin is telechelic and comprises at least two first resin polymerizable groups as endgroups. In an embodiment, the first resin is telechelic and comprises at least two first resin polymerizable groups as endgroups, and the first resin polymerizable groups comprise a (meth)acrylate group.

In an embodiment, in the particles comprising the resin component, the thermal radical initiator, and the retardant, the amount of the resin component is at least 40, at least 50, at least 55, at least 60, at least 65, at least 69, at least 70, or at least 75 wt %, based on the total weight of the first particles. In an embodiment, in the particles comprising the resin component, the thermal radical initiator, and the retardant, the amount of the resin component is at most 99, at most 95, at most 90, at most 88, at most 85, at most 82, at most 81, or at most 80 wt %, based on the total weight of the first particles. In an embodiment, the amount of the resin component is from 69 to 84 wt %, based on the total weight of the first particles.

In an embodiment, in the particles comprising the resin component, the thermal radical initiator, and the retardant, the amount of the first resin is at least 40, at least 50, at least 55, at least 60, at least 65, at least 69, at least 70, or at least 75 wt %, based on the total weight of the resin component. In an embodiment, in the particles comprising the resin component, the thermal radical initiator, and the retardant, the amount of the first resin is at most 99, at most 95, at most 90, at most 88, at most 85, at most 82, at most 81, or at most 80 wt %, based on the total weight of the resin component. In an embodiment, the amount of the first resin is from 69 to 84 wt %, based on the total weight of the resin component.

In an embodiment, the resin component, has a $M_n$ of at least 800, at least 1000, at least 1500, at least 1800, at least 2000, or at least 2300 Da. In an embodiment, the resin component has a $M_n$ of at most 20000, at most 10000, at most 9000, at most 8000, at most 7000, at most 6000, or at most 5000 Da. In an embodiment, the resin component has a $M_n$ of at least 2000 and at most 8000 Da.

In an embodiment, the first resin, has a $M_n$ of at least 800, at least 1000, at least 1500, at least 1800, at least 2000, or at least 2300 Da. In an embodiment, the first resin has a $M_n$ of at most 20000, at most 10000, at most 9000, at most 8000, at most 7000, at most 6000, or at most 5000 Da. In an embodiment, the first resin has a $M_n$ of at least 2000 and at most 8000 Da.

In an embodiment, the $M_n$ of the resin component divided by the average number of polymerizable groups in each molecule of the resin component is at least 150, at least 180, at least 200, at least 250, at least 300, at least 350, at least 400, at least 450, or at least 500 g/mol. In an embodiment, the $M_n$ of the resin component divided by the average number of polymerizable groups in each molecule of the resin component is at most 2000, at most 1500, at most 1300, at most 1200, at most 1100, at most 1000, at most 900, at most 850, at most 800 g/mol. In an embodiment, the $M_n$ of the resin component divided by the average number of polymerizable groups in each molecule of the resin component is from 450 to 1200 g/mol.

In an embodiment, the $M_n$ of the first resin divided by the average number of first resin polymerizable groups in each molecule of the first resin is at least 150, at least 180, at least 200, at least 250, at least 300, at least 350, at least 400, at least 450, or at least 500 g/mol. In an embodiment, the $M_n$ of the first resin divided by the average number of first resin polymerizable groups in each molecule of the first resin is at most 2000, at most 1500, at most 1300, at most 1200, at most 1100, at most 1000, at most 900, at most 850, at most 800 g/mol. In an embodiment, the $M_n$ of the first resin divided by the average number of first resin polymerizable groups in each molecule of the first resin is from 450 to 1200 g/mol. In an embodiment, the $M_n$ of the resin component divided by the average number of carbon-carbon double bonds directly attached to an electron withdrawing group in each molecule of the resin component is at least 150, at least 180, at least 200, at least 250, at least 300, at least 350, at least 400, at least 450, or at least 500 g/mol. In an embodiment, the $M_n$ of the resin component divided by the average number of carbon-carbon double bonds directly attached to an electron withdrawing group in each molecule of the resin component is at most 3000, at most 2000, at most 1500, at most 1300, at most 1200, at most 1100, at most 1000, at most 900, at most 850, at most 800 g/mol. In an embodiment, the $M_n$ of the resin component divided by the average number of carbon-carbon double bonds directly attached to an electron withdrawing group in each molecule of the resin component is from 450 to 1200 g/mol.

In an embodiment, the $M_n$ of the first resin divided by the average number of carbon-carbon double bonds directly attached to an electron withdrawing group in each molecule of the first resin is at least 150, at least 180, at least 200, at least 250, at least 300, at least 350, at least 400, at least 450, or at least 500 g/mol. In an embodiment, the $M_n$ of the first resin divided by the average number of carbon-carbon double bonds directly attached to an electron withdrawing group in each molecule of the first resin is at most 2000, at most 1500, at most 1300, at most 1200, at most 1100, at most 1000, at most 900, at most 850, at most 800 g/mol. In an embodiment, the $M_n$ of the first resin divided by the average number of carbon-carbon double bonds directly attached to an electron withdrawing group in each molecule of the first resin is from 450 to 1200 g/mol.

The first resin may be crystalline or amorphous. By "amorphous" it is meant that the resin does not show a melting peak, whereas crystalline and semi-crystalline resins show at least one melting peak. In an embodiment, an amorphous resin does not have a melting temperature ($T_m$). In an embodiment, a crystalline resin has a melting enthalpy ($\Delta H_m$) of at least 38, at least 40, at least 50, or at least 60 J/g.

In an embodiment, the first resin is amorphous and has an average number of carbon-carbon double bonds directly attached to an electron withdrawing group of at least 2 and at most 6. In an embodiment, the first resin is crystalline and has an average number of carbon-carbon double bonds directly attached to an electron withdrawing group of at least 2 and at most 4. In an embodiment, the first resin is crystalline and has an average number of carbon-carbon double bonds directly attached to an electron withdrawing group of at least 2 and at most 3. In an embodiment, the resin component comprises a first resin and a second resin, the first resin is amorphous and comprises a carbon-carbon double bond directly attached to an electron withdrawing group and the second resin is crystalline and comprises a carbon-carbon double bond directly attached to an electron withdrawing group.

In an embodiment, the first resin is amorphous and has a $M_n$ of at least 2000 and at most 8000 Da. In an embodiment, the first resin is amorphous and has a $M_n$ of at least 2000 and of at most 5000 Da.

In an embodiment, the first resin is amorphous and has a glass transition temperature (TO of at least 20, at least 25, at least 30, at least 40, at least 45, or at least 50° C. In an embodiment, the first resin is amorphous and has a glass transition temperature ($T_g$) of at most 120, at most 110, at most 100, at most 90, at most 80, at most 75, at most 70, at most 65, or at most 60° C. In an embodiment, the first resin is amorphous and has a glass transition temperature ($T_g$) of at least 20 and of at most 65° C. In an embodiment, the first resin is amorphous and has a melt viscosity at 160° C. of at least 1, at least 2, at least 5, at least 10, or at least 15 Pa·s. In an embodiment, the first resin is amorphous and has a melt viscosity at 160° C. of at most 400, at most 300, at most 200, at most 150, at most 100, at most 80, or at most 50 Pa·s. In an embodiment, the first resin is amorphous and has a melt viscosity at 160° C. of from 2 to 50 Pa·s.

In an embodiment, the first resin is crystalline and has a $M_n$ of at least 2000 and at most 8000 Da. In an embodiment, the first resin is crystalline and has a $M_n$ of at least 2300 and at most 8000 Da.

In an embodiment, the first resin is crystalline and has a glass transition temperature ($T_g$) of at least −70, at least −50, at least −40, at least −35, at least −20, at least −10, at least 0, at least 10, or at least 20° C. In an embodiment, the first resin is crystalline and has a glass transition temperature ($T_g$) of at most 120, at most 110, at most 100, at most 90, at most 80, at most 75, at most 70, at most 60, or at most 50° C.

In an embodiment, the first resin is crystalline and has a melting temperature ($T_m$) of at least 30, at least 40, at least 50, or at least 60° C. In an embodiment, the first resin is crystalline and has a melting temperature ($T_m$) of at most 200, at most 180, at most 160, at most 140, at most 130, at most 120, or at most 110° C. In an embodiment, the first resin is crystalline and the melting temperature is from 50 to 120° C. In case a resin has multiple meltings then the $T_m$ of the melting with the largest melting enthalpy ($\Delta H_m$) is taken as the $T_m$.

In an embodiment, the first resin is a polyester, acrylic (polyacrylate), polyurethane, epoxy, polyamide, polyesteramide, polycarbonate, polyurea, or a mixture or copolymer thereof. In an embodiment, the first resin is a polyester, polyurethane, polyamide, or a polyesteramide, or a mixture or copolymer. In an embodiment, the first resin is an unsaturated polyester.

In an embodiment, the first resin is a polyester, such as an unsaturated polyester. Polyesters are generally polycondensation products of polycarboxylic acids and polyols. Examples of polycarboxylic acids are isophthalic acid, terephthalic acid, hexahydroterephthalic acid, 2,6-naphthalenedicarboxylic acid and 4,4'-oxybisbenzoic acid, 3,6-dichlorophthalic acid, tetrachlorophthalic acid, tetrahydrophthalic acid, hexahydroterephthalic acid, hexachloroendomethylenetetrahydrophthalic acid, endomethylenetetrahydrophthalic acid, phthalic acid, azelaic acid, sebacic acid, decanedicarboxylic acid, adipic acid, succinic acid, fumaric acid, maleic acid or anhydride, itaconic acid or anhydride, mesaconic acid, citraconic acid and trimellitic acid. Examples of polyols are aliphatic diols, for example, ethylene glycol, propane-1,2-diol, propane-1,3-diol, butane-1,2-diol, butane-1,4-diol, butane-1,3-diol, 2,2-dimethylpropane-1,3-diol (neopentyl glycol), hexane-2,5-diol, hexane-1,6-diol, 2,2-bis-(4-hydroxycyclohexyl)-propane (hydrogenated bisphenol-A), 1,4-dimethylolcyclohexane, diethylene glycol, dipropylene glycol and 2,2-bis[4-(2-hydroxyethoxy)-phenyl]propane, the hydroxypivalic ester of neopentylglycol and 4,8-bis-(hydroxymethyl)tricyclo[5,2,1,0]decane (tricyclodecane dimethylol), and 2,3-butenediol.

Trifunctional or more functional alcohols or carboxylic acids can be used to obtain branched polyesters. Examples of suitable trifunctional or more functional alcohols or carboxylic acids include but not limited to glycerol, hexanetriol, trimethylol ethane, trimethylol propane, pentaerythritol and sorbitol, trimellitic acid, trimellitic acid anhydride, pyromellitic acid, or dimethylolpropionic acid.

Polyesters can be prepared via customary, generally known polymerization methods by conventional esterification and/or transesterification or by esterification and/or transesterification via the use of an enzyme. For example, if needed, customary esterification catalysts such as, for example, butylchlorotindihydroxide, dibutyltin oxide, tetrabutyl titanate or butyl stannoic acid can be used. Examples of these esterification catalysts used are 0.01-1 wt %, such as 0.1 wt %, based on the total weight of the polyester resin. Crystallinity may be introduced to a polyester by using one or more of the following diacids: succinic acid, adipic acid, sebacic acid or dodecanedioc acid, and/or one or more of the following diols: ethyleneglycol, hexanediol, butanediol, in the synthesis of the polyester.

In an embodiment, the first resin may be an acrylic, also known as a polyacrylate. Generally, an acrylic is based on alkyl esters of acrylic acid or methacrylic acid, optionally in combination with styrene. These alkyl esters of acrylic or methacrylic acid may be replaced by hydroxyl or glycidyl functional acrylic or methacrylic acids. Exemplary alkyl esters of acrylic or methacrylic acids include but are not limited to ethyl methacrylate, ethyl acrylate, isopropyl methacrylate, isopropyl acrylate, n-butyl methacrylate, n-butyl acrylate, n-propyl methacrylate, n-propyl acrylate, isobutyl methacrylate, isobutyl acrylate, ethylhexyl acrylate, cyclohexyl methacrylate, cyclohexyl acrylate and mixtures thereof. To obtain an acrylic resin having a hydroxy functionality, the acrylic resin contains a hydroxyl functional (meth)acrylic acid [by the term "(meth)acrylic" is meant herein "methacrylic or acrylic"], preferably in combination with alkyl esters of (meth)acrylic acid. Examples of hydroxyl functional (meth)acrylic acid esters include hydroxyethyl (meth)acrylate, and hydroxypropyl (meth)acrylate, etc. To obtain an acrylic resin having a glycidyl functionality, the acrylic resin contains a glycidyl functional (meth)acrylic acid esters, preferably in combination with alkyl esters of (meth)acrylic acid. Examples of glycidyl functional (meth)acrylic acid esters include glycidyl methacrylate, etc. It is also possible to synthesize acrylic resins with both hydroxyl and glycidyl functionality. The introduction of ethylenic unsaturations to an acrylic resin may be carried out by reacting the hydroxyl and/or glycidyl moieties on the acrylic resin with an unsaturated organic acid such as acrylic acid, methacrylic acid, 2-butenedioic acid, (meth) acrylic anhydride, and (meth)acryloylchloride.

In an embodiment, the first resin is a polyurethane. Polyurethanes can for example be prepared using customary, generally known polyaddition reaction of a (poly)isocyanate with a (poly)alcohol in the presence of, if needed a catalyst and other additives. For example, if needed, customary catalysts such as, for example, tertiary amines or organometallic compounds, such as, for example, monobutyltin, tris(2-ethylhexanoate), tetrabutyl titanate or dibutyl tin dilaurate can be used. Examples of the (poly)alcohols that may be used in the preparation of polyurethanes are the same as those that can be used in the preparation of a polyester. The (poly)alcohol may be a polyester polyol, a polyesteramide polyol, a polyether polyol, a polythioether polyol, a polycarbonate polyol, a polyacetal polyol, a polyvinyl polyol, a polysiloxane polyol, or an acrylic polyol. Suitable polyester polyols include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, bisphenol A derivatives, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydrides or dimethyl terephthalate. Polyesters obtained by the polymerisation of lactones, for example caprolactone, in conjunction with a polyol may also be used. Polyesteramides may be obtained by the inclusion of amino-alcohols, such as ethanolamine, in polyesterification mixtures. Examples of isocyanates that may be used in the preparation of polyurethanes include isophorone diisocyanate, hexane diisocyanate, 1,4-diisocyanatocyclohexane, naphthalene diisocyanate, 4,4'-diphenylmethane diisocyanate, 2,2'-Methylenediphenyl diisocyanate, hexamethylene diisocyanate, 2,4-toluene diisocyanate, 2,6-toluene diisocyanate, hexamethylene-1,6-diisocyanate, tetramethylene-1,4-diisocyanate, dicyclohexylmethane-4,4-diisocyanate, 1,4-benzene diisocyanate, 3,3'-diethoxy-4,4-diphenyl diisocyanate, m-phenylene diisocyanate, polymethylene polyphenyl diisocyanate, 2,4,6-triisopropyl-m-phenylene diisocyanate, 2,4,4-trimethylhexane-1,6 diisocyanate, and mixtures thereof. The introduction of ethylenic unsaturations to a polyurethane resin may be carried out by reacting an isocyanate moieties on the polyurethane resin with an unsaturated hydroxyl functional ester such as hydroxyl propyl methacrylate or hydroxyl ethyl acrylate or hydroxyl ethyl methacrylate; alternatively the introduction of ethylenic unsaturations to a polyurethane resin may be carried out by reacting the hydroxyl moieties on the polyurethane with an unsaturated organic acid such as acrylic acid, methacrylic acid, 2-butenedioic acid.

In an embodiment, the first resin is an epoxy. Epoxies may for example be prepared from phenolic compounds in combination with epichlorohydrins. In an embodiment, the epoxy is a bisphenol A diglycidyl ether, such as is commercially available as Epikote™ 1001, or a Novolac epoxide. The introduction of first resin polymerizable groups to an epoxy may be carried out by reacting the epoxy moieties on the epoxy with an unsaturated organic acid, such as acrylic acid, methacrylic acid, or 2-butenedioic acid.

In an embodiment, the first resin is a polyamide, a polyimide, or a polyamide-imide. In an embodiment, the first resin is a polyamide. Polyamides can for example be prepared by a polycondensation reaction of a diamine and a dicarboxylic acid. The dicarboxylic acids may be branched, non-linear or linear. Exemplary dicarboxylic acids include but are not limited to phthalic acid, isophthalic acid, terephthalic acid, 1,4-cyclohexanedicarboxylic acid, naphthalene-2,6-dicarboxylic acid, cyclohexanediacetic acid, diphenyl-4,4'-dicarboxylic acid, phenylenedi (oxyacetic acid), sebacic acid, succinic acid, adipic acid, glutaric acid and/or azelaic acid. Exemplary diamines include but are not limited to isophorondiamine, 1,2-ethylenediamine, 1,3-propylenediamine, 1,6-hexamethylenediamine, 1,12-dodecylenediamine, dimerfatty diamine, 1,4 cyclohexanebismethylamine, piperazine, p-xylylenediamine and/or m-xylylenediamine. The polyamide may also be branched using branching agents. Exemplary branching agents include but are not limited to amines for example di-alkylene-triamines, such as, for example, di-ethylene-triamine or di-hexamethylene-triamine; di-alkylene-tetramines or di-alkylene-pentamines; acids, for example 1,3,5-benzene tricarboxylic acid, or trimellitic anhydride; and poly-functional amino acids, such as, for example, aspartic acid or glutamic acid. The introduction of polymerizable groups may be carried out by reacting the carboxyl moieties on a polyamide resin with an unsaturated organic alcohol, such as hydroxyethylacrylate.

In an embodiment, the first resin is a polyesteramide. Polyesteramides are resins comprising both ester bonds (as in a polyester) and amide bonds (as in a polyamide). Polyesteramides may for example be prepared from mono-, di-, tri- or polyfunctional monomers, such as monomers with carboxylic acid functionality, monomers with hydroxyl functionality, monomers with amine functionality and/or monomers having a combination of any of these functionalities. The introduction of polymerizable groups may be carried out by reacting the carboxyl moieties on a polyesteramide resin with an unsaturated organic alcohol, such as hydroxyethyl(meth)acrylate.

In an embodiment, the first resin is a polycarbonate. The introduction of polymerizable groups to a polycarbonate may be carried out by reacting the hydroxyl moieties on the polycarbonate with an unsaturated organic acid such as acrylic acid, methacrylic acid, or 2-butenedioic acid.

In an embodiment, the first resin is a polyurea. Polyureas can, for example, be prepared using customary, generally known polyaddition reactions of a (poly)isocyanate with a (poly)amine in the presence of, if needed, a catalyst and other additives similar to what is described above for polyurethanes. Suitable (poly)amines for the preparation of polyureas include those as are exemplified above for the polyamides. Suitable (poly)isocyanates for the preparation of polyureas include those as are exemplified above for the polyurethanes.

Alternatively, polyureas can for example also be prepared using customary, generally known polycondensation reactions of a (poly)urethane with a polyamine. Suitable (poly) amines for the preparation of polyureas include those as are exemplified above for the polyamides. Suitable (poly)urethanes for the preparation of polyureas include isophoron di(m)ethylurethane, 1,6-hexane di(m)ethylurethane, 1,12-dodecylenedi(m)ethylurethane, dicyclohexylmethane-4,4-di (m)ethylurethane, and can for example be prepared from the reaction of a polyamine with di(m)ethylcarbonate. The introduction of ethylenic unsaturations to a polyurea may be, for example, carried out by reacting the amine and/or isocyanate moieties in the polyurea with an unsaturated organic acid such as (meth)acrylic acid or reacting an isocyanate moiety with an unsaturated hydroxyl functional ester such as hydroxyl propyl methacrylate, hydroxyl ethyl acrylate or hydroxyl ethyl methacrylate, or hydroxyl functional acrylamide such as hydroxyethylacrylamide.

The first resin polymerizable groups may be present in the backbone of the first resin and/or pendant to the backbone of the first resin and/or at the terminus of the first resin. In an embodiment, the first resin polymerizable group comprises an acrylate, methacrylate, fumarate, maleate, itaconate, citraconate, or mesaconate. Acrylates, methacrylates, fumarates, maleates, itaconates, citraconates, and mesaconates are polymerizable groups derived from acrylic acid, methacrylic acid, fumaric acid, maleic acid or anhydride, itaconic acid or anhydride, citraconic acid, and mesaconic acid, respectively.

A second or further resin (third, fourth, etc.) may be the same or different as the first resin. A second or further resin polymerizable group (third, fourth, etc.) may be the same or different as the first resin polymerizable group. Thus, although various aspects above are described relating to the first resin or first resin polymerizable group, the description is also intended to disclose the various aspects for further resins or resin polymerizable groups, such as a second resin, second resin polymerizable group, third resin, third resin polymerizable group, etc. Combinations of the various aspects of first resins and second resins are thus also intended to be disclosed.

In addition to the first resin polymerizable group comprising a carbon-carbon double bond directly attached to an electron withdrawing group, further resin polymerizable groups (e.g. a second resin polymerizable group) may be present. In an embodiment, the resin component comprises a second resin, the second resin comprising a second resin polymerizable group, the second resin polymerizable group comprising a carbon-carbon double bond that is able to (co)polymerize with the first resin polymerizable group. In an embodiment, further resin polymerizable groups may comprise carbon-carbon double bonds directly attached to an electron donating group.

In an embodiment, the resin component comprises a first resin, the first resin comprising a first resin polymerizable group, the first resin polymerizable group comprising a carbon-carbon double bond directly attached to an electron withdrawing group, and a second resin comprising a second resin polymerizable group, the second resin polymerizable group comprising a carbon-carbon double bond directly attached to an electron donating group. In an embodiment, the second resin polymerizable group comprises a vinyl ether. In an embodiment, the second resin comprises a mono vinyl ether or a di vinyl ether. In an embodiment, the second resin comprises a urethane (meth)acrylate.

In an embodiment, the second resin comprises a vinyl functionalized urethane resin or a vinyl functionalized urea resin. A vinyl functionalized urethane resin is a urethane resin comprising vinyl groups. A vinyl functionalized urea resin is a urea resin comprising vinyl groups. In an embodiment, the vinyl functionalized urethane resin is a vinyl ether polyurethane resin or a vinyl ester polyurethane resin. In an embodiment, the vinyl functionalized urea resin is a vinyl ether polyurea resin or a vinyl ester polyurea resin. In an embodiment, the vinyl functionalized urethane resin or vinyl functionalized urea resin is amorphous, crystalline, or semi-crystalline. In an embodiment, the vinyl functionalized urethane resin is a vinylether polyester urethane. In an embodiment, the vinyl functionalized urea resin is a vinylether polyester urea. The polyester part of a vinylether polyester urethane or urea is generally a polycondensation product of polyalcohols and polycarboxylic acids.

In order to prepare a vinyl functionalized urethane resin, an isocyanate may be reacted with a hydroxyfunctional vinylether and/or a polyalcohol. To prepare a vinylether polyester urethane, an isocyanate may be reacted with a hydroxyfunctional vinylether and a hydroxyfunctional polyester (for example a polyester as described above). The reactions may be performed in the presence of, if needed, a catalyst and other additives. Vinyl ester polyurethane or polyurea resins may be formed by a transvinylation process.

In an embodiment, the second resin is a vinyletherpolyester. Vinyletherpolyesters can, for example, be prepared from acid functional polyesters with hydroxyl functional vinylethers. It is also possible to prepare vinyletherpolyesters via transesterification of hydroxyfunctional or alkylfunctional polyesters with hydroxyfunctional vinylethers.

In an embodiment, the second resin is polymerizable, but is not able to copolymerize with the first resin. In an embodiment, the second resin polymerizable group comprises an epoxy. In an embodiment, the first resin polymerizable group is a (meth)acrylate and the second resin polymerizable group comprises an epoxy.

Thermal Radical Initiator

A thermal radical initiator is a component that generates sufficient radicals to initiate polymerization of the first resin within two hours when the thermal radical initiator is exposed to a temperature greater than or equal to an activation temperature, the activation temperature being greater than 30° C. The activation temperature is thus the lowest temperature at which the thermal radical initiator generates sufficient radicals to initiate polymerization of the first resin within two hours. In an embodiment, the activation temperature of the thermal radical initiator is greater than 40° C., 50° C., 60° C., 70° C., 80° C., 90° C., 100° C., 120° C., or 150° C. In an embodiment, the activation temperature of the thermal radical initiator is less than 300° C., 250° C., 200° C., 180° C., 160° C., 140° C., 120° C., 100° C., 80° C., 60° C., or 50° C. The radical may be generated by, for example, decomposition of the thermal radical initiator.

A thermal radical initiator is dispersed or dissolved in the resin component. The thermal radical initiator can be dispersed or dissolved in the resin by simple mixing with the resin component. For instance, the thermal radical initiator can be dispersed or dissolved in the resin component by mixing a composition comprising the resin, the thermal radical initiator, and the retardant and then forming particles from the composition such that the thermal radical initiator is dispersed or dissolved in the resin component. Merely blending resin component particles with thermal radical initiator particles is not dissolving or dispersing the thermal radical initiator in the resin component. A solvent treatment, extrusion, or kneading may be needed to dissolve or disperse the thermal radical initiator in the resin component. In an embodiment, the liquid composition further comprises a thermal radical initiator.

Examples of thermal radical initiators include, but are not limited to, azo compounds such as, for example, azo isobutyronitrile (AIBN), 1,1'-azobis(cyclohexanenitrile), 1,1'-azobis(2,4,4-trimethylpentane), C—C labile compounds, such as benzopinacole, peroxides, and mixtures thereof In an embodiment, the thermal radical initiator is a peroxide. Possibly suitable peroxides include organic and inorganic peroxides, whether solid or liquid (including peroxides on a carrier); also hydrogen peroxide may be applied.

Examples of suitable peroxides include for example, percarbonates (of the formula —OC(O)O—), peroxyesters (of the formula —C(O)OO—), diacylperoxides, also known as peranhydride (of the formula —C(O)OOC(O)—), dialkylperoxides or perethers (of the formula —OO—), hydroperoxides (of the formula —OOH), etc. The peroxides may also be oligomeric or polymeric in nature.

The thermal radical initiator may for example be a percarbonate, a perester or a peranhydride. Suitable peranhydrides are for example benzoylperoxide (BPO) and lauroyl peroxide (commercially available as Laurox™). Suitable peresters are for instance t-butyl per benzoate and 2-ethylhexyl perlaurate. Suitable percarbonates are for example di-t-butylpercarbonate and di-2-ethylhexylpercarbonate or monopercarbonates.

In an embodiment, the thermal radical initiator is an organic peroxide. Examples of suitable organic peroxides are: tertiary alkyl hydroperoxides (such as, for instance, t-butyl hydroperoxide), other hydroperoxides (such as, for instance, cumene hydroperoxide), a ketone peroxide (perketones, being an addition product of hydrogen peroxide and a ketone, such as, for instance, methyl ethyl ketone peroxide, methyl isobutylketone peroxide and acetylacetone peroxide), peroxyesters or peracids (such as, for instance, t-butyl peresters, benzoyl peroxide, peracetates and perbenzoates, lauroyl peroxide, including (di)peroxyesters, perethers (such as, for instance, peroxy diethyl ether). It is of course also possible to use mixtures of peroxides in the particles. Also, the peroxides may be mixed peroxides, i.e. peroxides containing any two different peroxy-bearing moieties in one molecule.

In an embodiment, the thermal radical initiator is a peranhydride, for example benzoyl peroxide or lauroyl peroxide, peroxydicarbonate, for example di(4-t-butylcyclohexyl)-peroxydicarbonate, dicetyl peroxydicarbonate, or dimyristylperoxydicarbonate.

Typically, the reactivity of a peroxide is determined by its half-life. With the exception of hydroperoxides, the half-life is determined by differential scanning calorimetry-thermal activity monitoring (DSC-TAM) of a dilute solution of the initiator in monochlorobenzene. For hydroxperoxides, the half-life is determined titrimetrically in monochlorobenzene. The half-life can be calculated from the following equation (1).

$$t_{1/2} = \ln\frac{2}{k_d} \qquad (1)$$

wherein $t_{1/2}$ is the half-life in second and $k_d$ is the rate constant for the thermal radical initiator dissociation in $s^{-1}$ and is determined by the following equation (2):

$$k_d = A \cdot e^{\frac{-E_a}{RT}} \qquad (2)$$

wherein A is the Arrhenius frequency factor in $s^{-1}$, $E_a$ is the activation energy for the initiator dissociating in J/mole, R is 8.3142 J/mole·K, and T is the temperature in K.

In an embodiment, the temperature at which the thermal radical initiator has a half-life ($t_{1/2}$) of 6 minutes or less is from 50 to 400° C. In an embodiment, the temperature at which the thermal radical initiator has a half-life of 6 minutes or less is 100° C. or higher, 110° C. or higher, 120° C. or higher, 130° C. or higher, 140° C. or higher, or 150° C. or higher. In an embodiment, the temperature at which the thermal radical initiator has a half-life of 6 minutes or less is 70° C. or higher, 80° C. or higher, 90° C. or higher, 100° C. or higher, 110° C. or higher, 120° C. or higher, 130° C. or higher, 140° C. or higher, or 150° C. or higher. In an embodiment, the temperature at which the thermal radical initiator has a half-life of 6 minutes or less is 50° C. or higher, 60° C. or higher, 70° C. or higher, 80° C. or higher, 90° C. or higher, 100° C. or higher, 110° C. or higher, 120° C. or higher, 130° C. or higher, 140° C. or higher, or 150° C. or higher. In an embodiment, the upper limit of the temperature at which the thermal radical initiator has a half-life of 6 minutes or less is 150° C., 175° C., 200° C., 225° C., 250° C., 275° C., 300° C., 325° C., 350° C., 375° C., or 400° C. In an embodiment, the lower limit of temperature at which the thermal radical initiator has a half-life of 6 minutes or less is −20° C., −10° C., 0° C., 10° C., 20° C., 30° C., 40° C., or 50° C. In an embodiment, in the amount of the thermal radical initiator in the first particles is at least 0.1, at least 0.2, at least 0.5, at least 1, at least 2, at least 3, at least 5, or at least 8 wt %, based on the total weight of the first particles. In an embodiment, the amount of the thermal radical initiator in the first particles is at most 30, at most 20, at most 15, at most 10, or at most 8 wt %, based on the total weight of the first particles. In an embodiment, the amount of the thermal radical initiator is from 0.5 to 5 wt %, based on the total weight of the first particles.

Retardant

A retardant is dispersed or dissolved in the resin component. In an embodiment, the liquid composition further comprises a retardant. In an embodiment, the retardant inhibits the onset of polymerization of the first particle polymerizable group in response to radicals generated by the thermal radical initiator. The retardant can be dispersed or dissolved in the resin by simple mixing with the resin. For instance, the retardant can be dispersed or dissolved in the resin by mixing a composition comprising the resin, the thermal radical initiator, and the retardant and then forming particles from the composition such that the retardant is dispersed or dissolved in the resin component. Merely blending resin component particles with retardant particles is not dissolving or dispersing the retardant in the resin component. A solvent treatment, extrusion, or kneading may be needed to dissolve or disperse the retardant in the resin component.

In an embodiment, the retardant is a phenolic compound, a stable radical, a catechol, a phenothiazine, a hydroquinone, a benzoquinone, or a mixture thereof.

In an embodiment, the retardant is a phenolic compound. Examples of phenolic compounds include 2-methoxyphenol, 4-methoxyphenol, 2,6-di-t-butyl-4-methylphenol, 2,6-di-t-butylphenol, 2,6-di-6-butyl-4-ethyl phenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol and 6,6'-di-t-butyl-2,2'-methylene di-p-cresol.

In an embodiment, the retardant is a stable radical. Examples of stable radicals include 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL and galvinoxyl (2,6-di-tert-butyl-α-(3,5-di-tert-butyl-4-oxo-2,5-cyclohexadien-1-ylidene)-p-tolyloxy).

In an embodiment, the retardant is a catechol. Examples of catechols include catechol, 4-tert-butylcatechol, and 3,5-di-tert-butylcatechol.

In an embodiment, the retardant is a hydroquinone. Examples of hydroquinones include hydroquinone, 2-methylhydroquinone, 2-tert-butylhydroquinone, 2,5-di-tert-butylhydroquinone, 2,6-di-tert-butylhydroquinone, 2,6-dimethylhydroquinone and 2,3,5-trimethylhydroquinone.

Examples of benzoquinones include benzoquinone, 2,3,5,6-tetrachloro-1,4-benzoquinone, methylbenzoquinone, 2,6-dimethylbenzoquinone, and napthoquinone.

Other suitable retardants may for example be chosen from the group of an aluminium-N-nitrosophenyl hydroxylamine, a diethylhydroxylamine and a phenothiazine.

In an embodiment, the retardant comprises hydroquinone, 2-methylhydroquinone, 2-tert-butylhydroquinone, 2,5-di-tert-butylhydroquinone, 2,6-di-tert-butylhydroquinone, 2,6-dimethylhydroquinone, or 2,3,5-trimethylhydroquinone. In an embodiment, the retardant comprises hydroquinone, 2-methylhydroquinone, 2-tert-butylhydroquinone, 2,5-di-tert-butylhydroquinone, 2,6-di-tert-butylhydroquinone, 2,6-dimethylhydroquinone, or a mixture thereof. In an embodiment, the retardant comprises hydroquinone, 2-methylhydroquinone, 2-tert-butylhydroquinone, 2,5-di-tert-butylhydroquinone, 2,6-di-tert-butylhydroquinone, or a mixture thereof. In an embodiment, the retardant comprises 2-methylhydroquinone or 2-tert-butylhydroquinone. Preferably, the amount of retardant in the composition for forming the first particles is at least 0.0001, more preferably is at least 0.0005, even more preferably is at least 0.0010, most preferably is at least 0.0025, especially is at least 0.0050, more especially is at least 0.010, most especially is at least 0.020, for example is at least 0.025, for example is at least 0.030, for example is at least 0.040, for example is at least 0.050, for example is at least 0.060, for example is at least 0.070, for example is at least 0.080, for example is at least 0.100 pph. The amount of retardant in the composition for forming the first particles is preferably at most 10, more preferably at most 5, even more preferably at most 2, most preferably at most 1, especially at most 0.75, more especially at most 0.50, most especially at most 0.25, for example is at most 0.20, for example is at most 0.150, for example is at most 0.125 pph. Preferably, the amount of retardant in the particulate composition is at least 0.025 and at most 0.125 pph.

Liquid Composition

The liquid composition may be selectively deposited using any suitable process, such as spraying, jetting, for instance by piezo, thermal, or bubble inkjet, or depositing over a mask or stencil. The liquid composition comprises at least a first liquid polymerizable component comprising a first liquid polymerizable group.

Liquid Polymerizable Component

The liquid polymerizable component is able to (co)polymerize with the first polymerizable group in the resin component. In an embodiment, the liquid polymerizable component comprises unsaturations as reactive moieties that are (co)polymerizable with the first polymerizable group of the resin. The liquid polymerizable component may comprise one or more liquid polymerizable components, such as a first liquid polymerizable component, a second liquid polymerizable component, etc. When the disclosure below states "the liquid polymerizable component" or the "liquid polymerizable group" it also discloses the first, second, and/or third, etc. liquid polymerizable component or liquid polymerizable group. The liquid polymerizable component may comprise components that are a monomer, oligomer, and/or polymer and components that may be monofunctional or polyfunctional.

The liquid polymerizable component comprises a liquid polymerizable group. In an embodiment, the liquid polymerizable component comprises an acrylate group, a methacrylate group, or a carbon-carbon double bond attached to an electron donating group. In an embodiment, the polymerizable group is a vinyl ester, vinyl ether, vinyl amide, vinyl amine, acrylate, methacrylate, or itaconate. In an embodiment, the polymerizable group is a vinylester, vinylether, vinyl amine, acrylate, or methacrylate. In an embodiment, the liquid polymerizable group comprises a vinyl ether, vinyl ester, or vinyl amine. In an embodiment, the liquid polymerizable group comprises a urethane vinyl ether or urethane vinyl ester.

Exemplary (meth) acrylates include isobornyl (meth) acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth) acrylate, 4-butylcyclohexyl (meth)acrylate, acryloyl morpholine, (meth)acrylic acid, 2-hydroxyethyl (meth)acrylate, 2-hydroxypropyl (meth)acrylate, 2-hydroxybutyl (meth) acrylate, methyl (meth)acrylate, ethyl (meth)acrylate, propyl (meth)acrylate, isopropyl (meth)acrylate, butyl (meth)acrylate, amyl (meth)acrylate, isobutyl (meth)acrylate, t-butyl (meth)acrylate, pentyl (meth)acrylate, caprolactone acrylate, isoamyl (meth)acrylate, hexyl (meth)acrylate, heptyl (meth) acrylate, octyl (meth)acrylate, isooctyl (meth)acrylate, 2-ethylhexyl (meth)acrylate, nonyl (meth)acrylate, decyl (meth)acrylate, isodecyl (meth)acrylate, tridecyl (meth) acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, benzyl (meth)acrylate, phenoxyethyl (meth)acrylate, polyethylene glycol mono(meth)acrylate, polypropylene glycol mono(meth) acrylate, methoxyethylene glycol (meth)acrylate, ethoxyethyl (meth)acrylate, methoxypolyethylene glycol (meth) acrylate, methoxypolypropylene glycol (meth)acrylate, diacetone (meth)acrylamide, beta-carboxyethyl (meth)acrylate, phthalic acid (meth)acrylate, dimethylaminoethyl (meth)acrylate, diethylaminoethyl (meth)acrylate, butylcarbamylethyl (meth)acrylate, n-isopropyl (meth)acrylamide fluorinated (meth)acrylate, 7-amino-3,7-dimethyloctyl (meth)acrylate, trimethylolpropane tri(meth)acrylate, pentaerythritol (meth)acrylate, ethylene glycol di(meth)acrylate, bisphenol A diglycidyl ether di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate; 3,9-bis(1,1-dimethyl-2-hydroxyethyl)-2,4,8,10-tetraoxaspiro[5.5]undecane di(meth)acrylate, 1,6-bis-(2-methacryloyloxy-ethoxycarbonylamino)-2,4,4-trimethyl-hexane (UDMA), dipentaerythritol monohydroxypenta(meth)acrylate, propoxylated trimethylolpropane tri(meth)acrylate, propoxylated neopentyl glycol di(meth)acrylate, tetraethylene glycol di(meth)acrylate, polyethylene glycol di(meth) acrylate, 1,4-butanediol di(meth)acrylate, 1,6-hexanediol di(meth)acrylate, neopentyl glycol di(meth)acrylate, polybutanediol di(meth)acrylate, tripropyleneglycol di(meth)acrylate, glycerol tri(meth)acrylate, phosphoric acid mono- and di(meth)acrylates, $C_7$-$C_{20}$ alkyl di(meth)acrylates, tris(2-hydroxyethyl)isocyanurate tri(meth)acrylate, tris(2-hydroxyethyl)isocyanurate di(meth)acrylate, pentaerythritol tri(meth)acrylate, pentaerythritol tetra(meth) acrylate, dipentaerythritol hexa(meth)acrylate, tricyclodecane diyl dimethyl di(meth)acrylate and alkoxylated versions (e.g., ethoxylated and/or propoxylated) of any of the preceding monomers, and also di(meth)acrylate of a diol which is an ethylene oxide or propylene oxide adduct to bisphenol A, di(meth)acrylate of a diol which is an ethylene oxide or propylene oxide adduct to hydrogenated bisphenol A, epoxy (meth)acrylate which is a (meth)acrylate adduct to bisphenol A of diglycidyl ether, diacrylate of polyoxyalkylated bisphenol A, and triethylene glycol divinyl ether, and adducts of hydroxyethyl acrylate.

In an embodiment, the liquid polymerizable component comprises an oligomer or polymer. In an embodiment, the liquid polymerizable component comprises an epoxy (meth) acrylate, urethane (meth)acrylates, or polyester(meth)acrylate.

In an embodiment, the liquid polymerizable component is selected from the group consisting of bisphenol A diglycidyl ether di(meth)acrylate, ethoxylated or propoxylated bisphenol A or bisphenol F di(meth)acrylate, dicyclopentadiene dimethanol di(meth)acrylate, [2-[1,1-dimethyl-2-[(1-oxoallyl)oxy]ethyl]-5-ethyl-1,3-dioxan-5-yl]methyl acrylate, dipentaerythritol monohydroxypenta(meth)acrylate, dipentaerythritol hexa(meth)crylate, propoxylated trimethylolpropane tri(meth)acrylate, propoxylated neopentyl glycol di(meth)acrylate, and any combination thereof.

Exemplary vinyl ethers include but are not limited to mono (alcohol) functionalized vinyl ethers, for example 6-hydroxyhexyl vinyl ether, 4-hydroxybutyl vinyl ether, 2-hydroxyethyl vinyl ether, hydroxybutyl vinyl ether, hydroxyethyl vinyl ether, diethylene glycol monovinyl ether, or 4-(hydroxyl methyl) cyclohexyl methyl vinyl ether (1,4-cyclohexanedimethanol vinyl ether). Further vinyl ethers include di (alcohol functionalized vinyl ethers, for example hexanediol divinylether, 1,4-cyclohexandimethanoldivinylether, butanedioldivinylether, diethyleneglycoldivinylether, or triethyleneglycoldivinylether.

Exemplary vinyl esters include but are not limited to hydroxyl vinyl esters and to those prepared by any of the methods well known to those of ordinary skill in the art. The hydroxyl vinyl esters are usually prepared by the reaction of acetaldehyde with acid chlorides in the presence of tertiary amines; methods for the preparation of hydroxyl vinyl esters are known in the art.

Exemplary vinyl amines include vinylimidazole, dimethylvinylamine, and N-vinylcarbazol. Exemplary vinyl amides include N-vinylcaprolactam, N-vinylpyrrolidone, and N-vinylformamide.

In an embodiment, the liquid composition comprises a first liquid polymerizable component and a second liquid polymerizable component. In an embodiment, the second liquid polymerizable group comprises an acrylate, methacrylate, fumarate, maleate, or itaconate. In an embodiment, the first liquid polymerizable component comprises a first liquid polymerizable group, and the first liquid polymerizable group comprises a carbon-carbon double bond that is able to (co)polymerize with the first resin polymerizable group and the second liquid polymerizable component comprises a second liquid polymerizable group, and the second liquid polymerizable group comprises a carbon-carbon double bond directly attached to an electron withdrawing group. In an embodiment, the second liquid polymerizable group is able to (co)polymerize with the first liquid polymerizable group. In an embodiment, the second liquid polymerizable group is able to (co)polymerize with a polymerizable group in the resin component, such as a first resin polymerizable group or a second resin polymerizable group. In an embodiment, the first liquid polymerizable group comprises a vinyl ether, and the second liquid polymerizable group comprises a fumarate.

In an embodiment, the liquid composition comprises a first liquid polymerizable component and a second liquid polymerizable component comprising a second liquid polymerizable group and the second liquid polymerizable group is not able to (co)polymerize with the first liquid polymerizable group. In an embodiment, the second liquid polymerizable group comprises an epoxy or an oxetane.

In an embodiment, the liquid polymerizable component in the liquid composition is at least 70, at least 80, at least 90, at least 92, at least 95, at least 96, at least 97, or at least 98 wt %, based on the total weight of the liquid composition. In an embodiment, the amount of the liquid polymerizable component in the liquid composition is at most 99.9, at most 99.5, at most 99, at most 98, or at most 95 wt %, based on the total weight of the liquid composition. In an embodiment, the amount of the liquid polymerizable component is from 95 to 99.9 wt %, based on the total weight of the liquid composition. In an embodiment, the amount of the liquid polymerizable component is from 98 to 99.5 wt %, based on the total weight of the liquid composition.

Optional Accelerator

In an embodiment, an accelerator is present in the liquid composition. When the accelerator comes in contact with a thermal radical initiator, the thermal radical initiator is decomposable at a temperature that is lower than the temperature at which the thermal radical initiator is decomposable in the absence of the accelerator. In an embodiment, an accelerator is additionally present in the particulate composition and a thermal radical initiator is additionally present in the liquid composition. In an embodiment, after depositing the liquid composition on the particulate composition, the accelerator comes into contact with the thermal radical initiator, thereby causing the thermal radical initiator to generate sufficient radicals at a temperature that is lower than the temperature at which a thermal radical initiator is able to generate sufficient radicals in the absence of the accelerator. In an embodiment, the temperature at which the thermal radical initiator is able to generate sufficient radicals in the absence of the accelerator is above the temperature of the particulate composition, whereas the temperature at which the thermal radical initiator is able to generate radicals in the presence of the accelerator is lower than the temperature of the particulate composition.

In an embodiment, the accelerator is an amine, acetoacetamide, ammonium salt, transition metal compound, or a mixture thereof.

In an embodiment, the accelerator is an amine. In an embodiment, the accelerator is a tertiary amine. In an embodiment, the accelerator is an aromatic tertiary amine comprising an electron donating group directly attached to an aromatic ring. In an embodiment, the accelerator comprises a β-hydroxy alkyl attached to a tertiary amine. In an embodiment, the accelerator is N,N-dimethylaniline, N,N-diethylaniline, N,N-diiosopropanol-para-toluidine, N,N-dimethyl-p-toluidine, N,N-bis(2-hydroxyethyl)xylidine, N,N-dimethylnaphtylamine, N,N-dimethyl toluidine, diisopropanol-p-toluidine, or ethyl N,N-dimethylamino benzoate.

In an embodiment, the accelerator is a transition metal compound. Preferably the transition metal has an atomic number of from 21 to 79. Examples of suitable transition metals are those of the following transition metals Sc, Ti, V, Cr, Mn, Fe, Co, Ni, Cu, Zn, Mo, W. In an embodiment, the transition metal is Mn, Fe, Co, or Cu. In an embodiment, the transition metal is Mn, Fe, or Cu. If a copper compound is used, it may for example be in the form of a $Cu^+$ salt or a $Cu^{2+}$ salt. If a manganese compound is used, it may for example be in the form of a $Mn^{2+}$ salt or a $Mn^{3+}$ salt. If a cobalt compound is used, it may for example be in the form of a $Co^{2+}$ salt.

In an embodiment, the transition metal compound is a transition metal salt, transition metal complex, or a mixture thereof. In an embodiment, the accelerator is a transition metal organic acid salt or a derivative of a transition metal organic acid salt. Examples of suitable transition metal compounds as accelerators are transition metal carboxylates and transition metal acetoacetates, for example transition metal ethylhexanoate.

Depending on the reactivity of the transition metal compound, the reactivity of the initiation system may be further enhanced using a co-accelerator. In an embodiment, the liquid composition comprises a co-accelerator. In an embodiment, the composition comprises a co-accelerator. The co-accelerator may be in the same composition (liquid or particulate) as the accelerator, or may be in a different composition (liquid or particulate). The co-accelerator may be in the same composition (liquid or particulate) as a thermal radical initiator, or may be in a different composition (liquid or particulate).

Examples of co-accelerators include 1,3-dioxocompounds, bases and thiol comprising compounds. In an embodiment, a co-accelerator is present in the liquid composition and is a 1,3-dioxo compound. In an embodiment, a co-accelerator is present in the liquid composition and comprises a 1,3-diketone, 1,3-dialdehyde, 1,3-ketoaldehyde, 1,3-ketoester, or a 1,3-ketoamide.

In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is at least 10° C., at least 20° C., at least 30° C., at least 40° C., at least 50° C., at least 60° C., at least 70° C., or at least 80° C. In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is at most 50° C., at most 60° C., at most 70° C., at most 80° C., at most 90° C., at most 100° C., at most 125° C., at most 150° C., at most 175° C., at most 200° C., at most 225° C., or at most 250° C. In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 200° C. In an embodiment, the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 100° C.

In an embodiment, the temperature at which the thermal radical initiator has a half-life of 6 minutes or less when the thermal radical initiator is not in contact with the accelerator is 100° C. or higher, 110° C. or higher, 120° C. or higher, 130° C. or higher, 140° C. or higher, or 150° C. or higher, and the temperature at which the thermal radical initiator has a half-life of 6 minutes or less when the thermal radical initiator is in contact with the accelerator is 90° C. or less, 80° C. or less, 70° C. or less, 60° C. or less, 50° C. or less, 40° C. or less, or 30° C. or less. In an embodiment, the temperature at which the thermal radical initiator has a half-life of 6 minutes or less when the thermal radical initiator is not in contact with the accelerator is 70° C. or higher, 80° C. or higher, 90° C. or higher, 100° C. or higher, 110° C. or higher, 120° C. or higher, 130° C. or higher, 140° C. or higher, or 150° C. or higher, and the temperature at which the thermal radical initiator has a half-life of 6 minutes or less when the thermal radical initiator is in contact with the accelerator is 60° C. or less, 50° C. or less, 40° C. or less, or 30° C. or less. In an embodiment, the temperature at which the thermal radical initiator has a half-life of 6 minutes or less when the thermal radical initiator is not in contact with the accelerator is 50° C. or higher, 60° C. or higher, 70° C. or higher, 80° C. or higher, 90° C. or higher, 100° C. or higher, 110° C. or higher, 120° C. or higher, 130° C. or higher, 140° C. or higher, or 150° C. or higher, and the temperature at which the thermal radical initiator has a half-life of 6 minutes or less when the thermal radical initiator is in contact with the accelerator is 40° C. or less or 30° C. or less. In an embodiment, the temperature at which the thermal radical initiator has a half-life of 6 minutes or less when the thermal radical initiator is in contact with the accelerator is from 20° C. to 50° C.

In an embodiment, the amount of the accelerator in the liquid composition is at least 0.01, at least 0.1, at least 0.2, at least 0.5, at least 1, at least 2, or at least 3 wt %, based on the total weight of the liquid composition. In an embodiment, the amount of the accelerator in the liquid composition is at most 8, at most 6, at most 5, at most 3, or at most 2 wt %, based on the total weight of the liquid composition. In an embodiment, the amount of the accelerator is from 0.1 to 5 wt %, based on the total weight of the liquid composition. In an embodiment, the amount of the accelerator is from 0.5 to 2 wt %, based on the total weight of the liquid composition.

Optional Liquid Radical Initiator

In an embodiment, the liquid composition further comprises a liquid radical initiator. The term liquid radical initiator is used to refer to a radical initiator in the liquid composition. The liquid radical initiator does not need to be a liquid itself. However, in an embodiment, the liquid radical initiator is a liquid at 30° C. The liquid radical initiator is capable of generating radicals that lead to polymerization of the first resin and/or the liquid polymerizable component. In an embodiment, the liquid radical initiator is a thermal radical initiator, as described above.

In an embodiment, the liquid radical initiator is a radical photo-initiator. In an embodiment, the liquid radical initiator is selected from the group consisting of benzoylphosphine oxides, aryl ketones, benzophenones, hydroxylated ketones, I-hydroxyphenyl ketones, ketals, metallocenes, and any combination thereof.

In an embodiment, the liquid composition comprises a radical photo-initiator comprising 2,4,6-trimethylbenzoyl diphenylphosphine oxide and 2,4,6-trimethylbenzoyl phenyl, ethoxy phosphine oxide, bis(2,4,6-trimethylbenzoyl)-phenylphosphineoxide, 2-methyl-1-[4-(methylthio)phenyl]-2-morpholinopropanone-1, 2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, 4-benzoyl-4'-methyl diphenyl sulphide, 4,4'-bis (diethylamino) benzophenone, and 4,4'-bis(N,N'-dimethylamino) benzophenone (Michler's ketone), benzophenone, 4-methyl benzophenone, 2,4,6-trimethyl benzophenone, dimethoxybenzophenone, 1-hydroxycyclohexyl phenyl ketone, phenyl (1-hydroxyisopropyl) ketone, 2-hydroxy-1-[4-(2-hydroxyethoxy) phenyl]-2-methyl-1-propanone, 4-isopropylphenyl(1-hydroxyisopropyl)ketone, oligo-[2-hydroxy-2-methyl-1-[4-(1-methylvinyl)phenyl] propanone], camphorquinone, 4,4'-bis(diethylamino) benzophenone, benzil dimethyl ketal, bis(eta 5-2-4-cyclopentadien-1-yl) bis[2,6-difluoro-3-(1H-pyrrol-1-yl) phenyl] titanium, and any combination thereof.

In an embodiment, the liquid composition comprises a radical photo-initiator comprising benzoylphosphine oxides, such as, for example, 2,4,6-trimethylbenzoyl diphenylphosphine oxide (Lucirin TPO from BASF) and 2,4,6-trimethylbenzoyl phenyl, ethoxy phosphine oxide (Lucirin TPO-L from BASF), bis(2,4,6-trimethylbenzoyl)-phenylphosphineoxide (Irgacure 819 or BAPO from Ciba), 2-methyl-1-[4-(methylthio)phenyl]-2-morpholinopropanone-1 (Irgacure 907 from Ciba), 2-benzyl-2-(dimethylamino)-1-[4-(4-morpholinyl) phenyl]-1-butanone (Irgacure 369 from Ciba), 2-dimethylamino-2-(4-methyl-benzyl)-1-(4-morpholin-4-yl-phenyl)-butan-1-one (Irgacure 379 from Ciba), 4-benzoyl-4'-methyl diphenyl sulphide (Chivacure BMS from Chitec), 4,4'-bis(diethylamino) benzophenone (Chivacure EMK from Chitec), and 4,4'-bis(N,N'-dimethylamino) benzophenone (Michler's ketone). Also suitable are mixtures thereof.

Additionally, photosensitizers may be useful in conjunction with radical photo-initiators, depending on the wavelength of electromagnetic radical employed. Examples of suitable photosensitizers include: anthraquinones, such as 2-methylanthraquinone, 2-ethylanthraquinone, 2-tertbutylanthraquinone, 1-chloroanthraquinone, and 2-amylanthraquinone, thioxanthones and xanthones, such as isopropyl thioxanthone, 2-chlorothioxanthone, 2,4-diethylthioxanthone, and 1-chloro-4-propoxythioxanthone, methyl benzoyl formate (Darocur MBF from Ciba), methyl-2-benzoyl benzoate (Chivacure OMB from Chitec), 4-benzoyl-4'-methyl diphenyl sulphide (Chivacure BMS from Chitec), 4,4'-bis(diethylamino) benzophenone (Chivacure EMK from Chitec).

The liquid radical initiator may be present up to about 10 wt % of the liquid composition, in certain embodiments, up to about 6 wt % of the liquid composition, and in further embodiments from about 0.01 wt % to about 5 wt % by weight of the liquid composition, based on the total weight of the liquid composition. In an embodiment, the liquid composition comprises from 0.1 wt % to 4 wt % of a liquid radical initiator, based on the total weight of the liquid composition.

Optional Plasticizer

In an embodiment, the liquid composition further comprises a plasticizer. In an embodiment, the plasticizer is a liquid. In an embodiment, the plasticizer is an polyalkylene ether. In an embodiment, the plasticizer is decanol, glycerol, ethylene glycol, diethylene glycol, polyethylene glycol, propylene glycol, or a fatty acid. In an embodiment, the plasticizer is a dialkyl phthalate, such as dioctyl phthalate. In an embodiment, the plasticizer is trimethyl trimellitate, tri-(2-ethylhexyl) trimellitate, tri-(n-octyl,n-decyl) trimellitate, tri-(heptyl,nonyl) trimellitate, n-octyl trimellitate, bis (2-ethylhexyl)adipate, dimethyl adipate, monomethyl adipate, dioctyl adipate, dibutyl sebacate, dibutyl maleate, or diisobutyl maleate. In an embodiment, the amount of plasticizer is less than 25, 20, 15, or 10 wt % of the total liquid composition. In an embodiment, the amount of plasticizer is more than 1, 5, 10, or 20 wt % of the total liquid composition.

Optional Absorber

In an embodiment, the liquid composition or the particulate composition further comprise an absorber. The absorber is able to absorb electromagnetic radiation. In an embodiment, the absorber absorbs one or more of infrared light, near infrared light, and visible light. By including an absorber and carrying out the optional step of applying electromagnetic radiation to a plurality of the locations of the layer of the particulate composition where the liquid composition has been selectively deposited, a higher temperature may be obtained at the layer of the particulate composition where the absorber is present. The wavelengths that are absorbed by the absorber should overlap with the wavelengths of the electromagnetic radiation.

Attaining a higher temperature may cause the thermal radical initiator to generate more radicals than would be generated in the absence of the absorber. Preferably, the absorber is present in the liquid composition, thereby causing an increased temperature in the areas of the particulate composition on which the absorber is deposited relative to the areas of the particulate composition where the absorber is not deposited.

In an embodiment, the absorber is a pigment, a dye, metallic particles, or carbon black.

In a further optional step, an inhibitor may be deposited on the particulate composition. An inhibitor may be useful to inhibit the curing of the particulate composition and, optionally, the liquid composition. Inhibitors may be, for example, a retardant, a reflector, or a barrier. Suitable retardants are as described above.

A reflector operates to reflect electromagnetic radiation. For example, in the case that the optional step of applying electromagnetic radiation to a plurality of the locations of the layer of the particulate composition where the liquid composition has been selectively deposited is carried out, a reflector may be deposited on the areas of the particulate composition where it is not desired to promote curing. In an embodiment, the reflector is selectively deposited at a location wherein the liquid composition is not deposited.

Potential reflectors are pigments or dyes, for example metallic inks or silver pigments. A reflective powder or thermal insulator may also be used, such as a ceramic powder. The reflector may be present along with a suitable carrier, such as water or another solvent.

A barrier operates as a barrier between the particulate composition and the liquid composition. Such a material may thus affect the ability of the liquid composition to contact or penetrate the particulate composition. In an embodiment, the barrier is a silicone.

In an embodiment, the liquid composition comprises a colorant and the colorant comprises a pigment or a dye. In this way, the final three-dimensional object may be provided with a visible color.

In an embodiment, the liquid composition comprises a surfactant. A surfactant reduces the surface tension of the liquid composition and thus may be used to improve the wetting of the particulate composition by the liquid composition. Exemplary surfactants are block copolymers of i) silicone and ii) ethyleneoxide and/or propyleneoxide. In an embodiment, the surfactant is a linear block copolymer comprising blocks of i) polydimethylsiloxane and ii) blocks of ethyleneoxide and/or blocks of propyleneoxide. In an embodiment, the surfactant is a polymer comprising a polydimethylsiloxane backbone and pendant groups of blocks of ethyleneoxide and/or blocks of propyleneoxide. Exemplary surfacants are Silwet® products from Momentive™. Further exemplary surfactants are polyacrylates and naphtha/methoxy propanol acetates, such as certain surface additives, air release additives, or wetting or air release additives available from BYK, such as non-silicone wetting or air release additives from BYK. Further exemplary surfactants are fluorosurfactants, suchas Novec FC4430, Novec FC4432, and Zonyl FSO.

In an embodiment, the liquid composition is selectively dispensed onto the layer of the particulate composition in accordance with a plurality of voxels representing a portion of the three-dimensional object. A voxel is a three-dimensional pixel and may have a defined volume. The volume of the voxel may correspond with the resolution of the method of forming a three-dimensional object. For example, a voxel may be defined by the size of a droplet of liquid composition that is selectively dispensed, which will be able to cure a certain depth of a particulate composition. The voxel volume would thus correspond to the area of the droplet multiplied by the size of the depth of the associated particulate composition that would be cured.

In certain embodiments, the molar ratio of various species of polymerizable groups is controlled. In an embodiment, the molar ratio of vinyl ether groups to fumarate and maleate groups per voxel is from 5:1 to 1:5. In an embodiment, the molar ratio of vinyl ether groups to fumarate and maleate groups per voxel is from 1.5:1 to 1:1.5. In an embodiment, the molar ratio of vinyl ether groups to fumarate and maleate groups per voxel is from 1.1:1 to 1:1.1. In an embodiment, the molar ratio of methacrylate groups to vinyl ether groups to fumarate and maleate groups per voxel is from 4.5:2.5:1 to 3.5:1.5:1.

In certain embodiments, the amount of particulate composition and liquid composition may be defined based upon the amount of each present per voxel. In an embodiment, the ratio of weight of the particulate composition to weight of the liquid composition per voxel is from 30:70 to 70:30. In an embodiment, the ratio of weight of the particulate composition to weight of the liquid composition per voxel is from 95:5 to 50:50.

In an embodiment, the thermal radical initiator is a peroxide, the accelerator is present and is an amine, and the molar ratio of peroxide to amine per voxel is 0.1:2, 0.2:1.5, or 0.5:1.1. In an embodiment, the accelerator is present and is a transition metal compound and the amount of transition metal compound is at least 0.01, at least 0.05, at least 0.1 mmol per kg particulate composition plus liquid composition per voxel. In an embodiment, an accelerator is present and is a transition metal compound and the amount of transition metal compound is at most 10, at most 5, or at most 3 mmol per kg of particulate composition plus liquid composition per voxel. In an embodiment, an accelerator is present and is a transition metal compound and the amount of transition metal compound is from 1 to 3 mmol per kg of particulate composition plus liquid composition per voxel.

Further embodiments relate to three-dimensional objects formed from the methods or the kits of materials as previously described.

Measurement Methods

Unless stated otherwise, any measurements reported or claimed in this patent application are obtained as follows.

The glass transition temperature ($T_g$), melting temperature ($T_m$), crystallization temperature ($T_c$), melting enthalpy ($\Delta H_m$), crystallization enthalpy ($\Delta H_c$), and reaction enthalpy ($\Delta H_r$) measurements are carried out via differential scanning calorimetry (DSC) on a TA instruments DSC Q2000 equipped with a Refrigerated Cooling System 90 in $N_2$ atmosphere and calibrated with indium. The processing of the signal (DSC thermogram, Heat Flow vs. Temperature) is carried out using Universal Analysis 2000 software version 4.5a provided by TA instruments with samples of 8±5 mg in Al cups from TA instruments. The heating rate is 5° C./min.

Acid and hydroxyl values are respectively determined titrimetrically according to ISO 2114-2000 and ISO 4629-1978. NCO value is measured according to ASTM D 2572-97.

Number average molecular weight ($M_e$) is measured by GPC on an Alliance Waters 2695 GPC with two consecutive PL-gel columns, type Mixed-C, l/d=300/7.5 mm (Polymer Laboratories), size of column particles 10 µm, using stabilized tetrahydrofuran (THF) modified with 0.8% acetic acid as the eluent at 1 mL/min at 40° C. and using an Alliance Waters 2414 refractive index detector at 40° C. A set of polystyrene standards with a molecular weight range of from 500 to $7 \times 10^6$ g/mol is used to calibrate the GPC equipment.

The following examples serve to further elucidate the present inventions, but should in no way be construed as limiting their scope.

EXAMPLES

Some of the various components used in the Examples are described in Table 0.1 and 0.2, below. WPU is the weight per unsaturation. WPU is calculated by dividing the weight of the material made by the moles of unsaturations added.

TABLE 0.1

Materials used in the Examples

| Ref | Type | Description | Chemical Name or Commercial Product |
|---|---|---|---|
| P1900 | Resin component | Semi-crystalline divinylether | DSM Uralac ® P1900; NCO < 0.1%; $T_m$ 96-103 ° C.; WPU 200 g/mol |
| UPE1010 | Resin component | amorphous unsaturated polyester | DSM Uralac ® P1010; AV ≤ 5 mg KOH/g resin; WPU 550 g/mol; Tg 55 ° C. |
| SOEA | Resin Component | Polyester acrylate | Formed as described below |
| UVECOAT | Resin Component | Polyester methacrylate | Allnex UVECOAT21000 ®; AV ≤3 mg KOH/g resin, Tg = 57° C. |
| UPEcrys | Resin component | semi-crystalline unsaturated polyester | Formed as described below |
| Non-functional PE | Resin component | Non-functional polyester | Formed as described below |

TABLE 0.1-continued

Materials used in the Examples

| Ref | Type | Description | Chemical Name or Commercial Product |
|---|---|---|---|
| PU-ma | Resin component | Polyurethane methacrylate | Formed as described below |
| PE-U-ma | Resin component | Polyester Urethane methacrylate | Formed as described below |
| mBPO | thermal radical initiator | peroxide | Di(4-methylbenzoyl) peroxide |
| LPO | thermal radical initiator | peroxide | Lauroyl peroxide |

TABLE 0.2

Materials used in the Examples (continued from Table 0.1)

| Ref | Type | Description | Chemical Name or Commercial Product |
|---|---|---|---|
| DEGDVE | Liquid polymerizable component | Divinyl ether | Di(ethylene glycol) divinyl ether |
| CHDVE | Liquid polymerizable component | Divinyl ether | 1,4-Cyclohexanedimethanol divinyl ether |
| DEF | Liquid polymerizable component | Fumarate | Diethyl fumarate |
| HEMA | Liquid polymerizable component | Methacrylate | 2-hydroxyethyl methacrylate |
| CTFA | Liquid polymerizable component | Acrylate | (5-ethyl-1,3-dioxan-5-yl)methyl acrylate |
| IBOA | Liquid polymerizable component | Acrylate | Isobornyl acrylate |
| NBUA | Liquid polymerizable component | Acrylate | 2-[[(Butylamino)carbonyl]oxy] ethyl acrylate |
| DMPT | Accelerator | amine | N,N-dimethyl-p-toluidine |
| DEA | Accelerator | amine | diethylamine |
| NL-49 | Accelerator | metal | Cobalt octanoate (1 wt % Co) |

Formation of Certain Resin Components

SOEA is formed as follows. First, a polyester polyol is formed: 20 mol terephthalic acid, 20 mol neopentyl glycol and 1 mol trimethylol propane are esterified with 0.1% BuSnCl(OH)2 at 180-240° C. until the acid value<10. Then, the resulting polyester polyol is acrylated as follows. The polyester polyol of step 1 is cooled to 120° C. and mixed with 105 mol % acrylic acid (to amount OH), 15 wt % toluene, 1 wt % p-Toluenesulfonic acid (PTSA), and 0.2 wt % dibutylhydroquinon (all based on amount polyester polyol+acrylic acid). Air is purged through the reaction mixture and the temperature is increased until the toluene boils. Next, the mixture is refluxed (120-140° C.) for 8 hours in a flask equipped with a Dean-Stark set up. If necessary, the pressure is reduced to keep the toluene refluxing. After 8 hours, a sample is taken and titrated potentiometrically to determine the acid value belonging to free PTSA (AV1) and the acid value of the carboxylic acids (AV2). 105 mol % (to AV1 of PTSA) 3-ethyl-3-hydroxymethyloxetane is added to neutralize the PTSA. After 15 minutes, a sample is taken to check if AV1=0 and subsequently the solvent and residual acrylic acid is removed via distillation at 160° C. and 50 mm Hg. The final values are AV1=0 and AV2=8.9. The Tg (DSC) of the resin is 45° C.

UPEcrys is formed as follows. A reactor vessel fitted with a thermometer, a stirrer and a distillation device for the removal of water formed during the synthesis, is filled with 1.0 g of tin catalyst, diethyleneglycol (187.5 g) and 1,6-hexanediol (875.9 g). The vessel is heated to 150° C. until the mixture is molten. Next, terephthalic acid (1117.9 g) is added under a nitrogen flow and the temperature is gradually increased to 250° C. while distilling the reaction water until no water is collected anymore. The reaction mixture is cooled to 180° C. and fumaric acid (153.9 g) is added, after which the temperature is increased to 205° C. while distilling off the water. When no water is collected anymore, vacuum is applied for 2.5 hours, after which the resin is discharged onto an aluminum foil and kept at room temperature. Acid value (AV)=2.6 mg KOH/g and OH=54.3 mg KOH/g. DSC is done from −50-175° C. with 5° C./min for two runs with a maximum cooling speed ("jump" in program) in between. The data from the second run is taken: $T_g$=−10.4° C., $T_c$=6.3° C. and $T_m$=109.5° C., in which $T_c$ and $T_m$ are the crystallization and melting temperature (top of the peaks) of the resin. The melting enthalpy is 38 J/g.

Non-functional PE is formed as follows. A reactor vessel fitted with a thermometer, a stirrer and a distillation device for the removal of water formed during the synthesis, is filled with 3.4 g of tin catalyst and 1,2 propanediol (1847.8 g). The vessel is heated to 150° C. and terephthalic acid (3503.4 g) is added under a nitrogen flow, after which the temperature is gradually increased to 245° C. while distilling off the reaction water until no water is collected anymore. The reaction mixture is cooled to 215° C. and vacuum is applied for 3 hours, after which the resin has an AV of 3.7. The material is cooled to 180° C. and 26.2 g of ethylenecarbonate is added and left standing overnight. The next day the resin is heated to 200° C. and vacuum is applied for 2.5 hours, after which the material is discharged onto an aluminum foil and kept at room temperature. AV=1.8 mg KOH/g and OH=38.9 mg KOH/g. For $T_g$ measurement the sample is heated in the DSC to 150° C. at 40° C./min and kept for 10 minutes. After fast cooling to 0° C. the resin is heated to 100° C. at 5° C./min and a $T_g$ of 67.9° C. is measured.

PU-ma is formed as follows. 152.04 g of hexamethylene diisocyanate is added to a reactor vessel with stirring and heated to 70° C. 0.04 g of TIB cat 716 from TIB chemicals ((Bismuth(neodecanoate)) is then added. Over a period of 10 minutes, 47.96 g of diethylene glycol is added. During this feeding process the temperature is maintained at 90-92° C. After completion of the feed, the mixture is kept at 90-92° C. for 5 minutes. After 5 minutes 0.04 g of TIB cat 716 from TIB chemicals ((Bismuth(neodecanoate)) and 0.04 g of 2,6-Di-tert-butyl-4-methylphenol are added as a shot to the reaction mixture. 105.87 g of 2,-hydroxyethyl methacrylate is then added slowly over a period of 40 minutes. During this feeding process the temperature is maintained at 90-92° C. After completion of the feed, 6.11 g of Trigonox® C from AkzoNobel (tBu-peroxybenzoate) is added as a shot to the reactor phase. After this addition the mixture is stirred for another 5 minutes and cooled to room temperature. The material crystallizes upon cooling.

PE-U-ma is formed as follows. A reactor vessel fitted with a thermometer, a stirrer and a distillation device for the removal of water formed during the synthesis, was filled with 1.0 g of tin catalyst, diethyleneglycol (172.4 g) and 1,6-hexanediol (848.9 g). The vessel is heated to 150° C. under a flow of nitrogen until the mixture is molten. Terephthalic acid (1100.4 g) and isophthalic acid (194.0 g) are added under a nitrogen flow. The temperature is gradually increased to 260° C. while distilling the reaction water until no water formation is visible anymore. The reaction mixture is cooled to 220° C. and a vacuum is applied for 2.5 hours. The resin is then discharged onto an aluminium foil and kept at room temperature. AV=0.7 mg KOH/g and OH=41.2 mg KOH/g. DSC is performed from −50-175° C. with 5° C./min for two runs with a maximum cooling speed ("jump" in program) in between. The data from the second run is taken: $T_g$=−2.7° C., $T_c$=21.4° C., and $T_m$=108.9° C., in which $T_c$ and $T_m$ are the crystallization and melting temperature of the resin. The melting enthalpy is 32.6 J/g.

In a separate stirred reactor under lean air isophorone diisocyanate (80.1 g), dibutyltindilaurate (0.5 g), and 2,6-di-tertiair butyl-p-cresol (0.5 g) are added and heated to 20° C. Through a dropping funnel 2-hydroxyethylmethacrylate (46.9 g) is added over a period of 1.5 hours to 2 hours, allowing the temperature to increase to 35° C. The mixture is heated to 40° C. and after 2 hours the NCO % was 11.5. 127.1 g of this isocyanate adduct is transferred to a dropping funnel and kept at a low viscosity by means of heating with an IR-lamp. The resin formed above (500 g) is molten in a reactor at 120° C. and the isocyanate adduct is added over 15 minutes with stirring under lean air. The mixture is left to react for another 40 minutes, after which the NCO % was below 0.1. The material is discharged on an aluminum foil. Tg of the material was 13.1° C. and the melting point 103.6° C. The melting enthalpy is 0.9 J/g.

Method of Forming Particulate Compositions

For particulate compositions not containing PU-ma, the resin component, and also the resin component and/or the retardant in the case that a thermal radical initiator and/or a retardant is dispersed or dissolved in the resin component, is/are mixed in a blender and subsequently extruded in a PRISM TSE16 PC twin screw at 70° C., regulating the screw speed such that a torque of 70-90% of the maximum for the extruder is reached. The extrudate is allowed to cool to room temperature and broken into chips. The chips are milled in a Retsch ZM100 with a 0.5 mm ring sieve at 18000 rpm and then sieved. The sieve fraction with particle size below 90 µm is collected.

For particulate compositions comprising PU-ma, the thermal radical initiator ((tBu-peroxybenzoate) and retardant (2,6-Di-tert-butyl-4-methylphenol) are added during the synthesis of the material as described above. After cooling to room temperature, the material is milled in a blender. The average particle size is less than 500 µm.

In the case that a thermal radical initiator is blended in the particulate composition, the milled and sieved particles are placed in a blender and mixed with the thermal radical initiator.

Method of Forming Liquid Compositions

The components of the liquid composition are thoroughly mixed at room temperature.

Method of Forming Films

The particulate compositions are applied onto 0.8 mm thick chromate aluminum Q-panels (type ALQ-46). All particulate compositions except for those containing PU-ma as resin component are applied on treated Q-panels. PU-ma is formed on an untreated Q-panel. A treated Q-panel is formed by treating the Q-panel with 1-STEP Frekote® mould release agent from Loctite and then drying in a Heraeus Instruments UT6120 oven at 130° C. for 15 minutes. This procedure is repeated twice more for a total of three times for each Q-panel to form a treated Q-panel.

After forming the particulate compositions and liquid compositions, films are prepared as follows. A layer of a particulate composition is sprayed on a Q-panel by a Wagner manual gun PEM-X1 combined with an EPG-Sprint X control unit. Next, a quantity of the specified liquid composition is applied to the layer of the specified particulate composition by air brush gun (model: Iwata Eclipse HP-BCS bottom-feed airbrush) at room temperature. The Q-panel is placed in a vertical position and the liquid composition is sprayed onto the particulate composition from about 10 to 20 cm distance. The weight of the panel is measured before and after spraying to determine the amount liquid composition applied. The wt % of liquid composition indicated in the following tables is the amount of liquid composition relative to the total amount of particulate composition and liquid composition on the Q-panel.

The amount in wt % of liquid composition is recorded for each layer formed. For instance, if the table shows three values for amount of liquid composition, the first value is for the first layer, the second value is for the second layer that is formed directly on top of the first layer, and the third value is for the third layer that is formed directly on top of the second layer. The amount of layers is not expected to substantially influence the results of the Acetone Spot Test or DMA.

Unless "wet" is indicated when reporting the amounts of liquid composition for each layer, five minutes after applying the layer of liquid composition the Q-panel is placed in an oven at the indicated temperature (indicated in the following tables as "Temp") for five minutes. If additional layers are formed, the Q-panel is taken out of the oven, an additional layer of particulate composition is formed on top of the previously formed layer, and then the liquid composition is sprayed onto the particulate composition.

If "wet" is indicated when reporting the amounts of liquid composition for each layer, then the Q-panel is only placed in the oven at the indicated temperature after the final layer is formed, rather than after each layer.

Acetone Spot Test (AST)

After storing the formed film at ambient conditions for a few days, a few drops of acetone are deposited on the film and after about 10 seconds the acetone is removed with a cloth. The layers are then assessed by visual inspection. A '+' indicates that the layer is not harmed by the AST. A '+/−' indicates that the top layer is harmed or partially wiped away. A '−' indicates that the layer is completely or nearly completely wiped away.

Dynamic Mechanical Analysis (DMA)

Samples with a width of approximately 2 mm are punched out of the cured films. The thickness is measured with a calibrated Heidenhain thickness meter. The dynamic mechanical analyses are carried out in accordance with ASTM D5026 using a RSA-III test system at a frequency of 1 Hz and over a temperature ranging from −100° C. to 200° C. with a heating rate of 5° C./min. During the measurements, the storage modulus (E'), loss modulus (E") and tangent delta (tan δ) are determined as a function of temperature. "not." means not tested.

Example 1—Stability and Curing Properties of Particulate Composition

Various particulate compositions are formed comprising a plurality of particles. The particles comprise a resin component comprising an amorphous unsaturated polyester (UPE1010) and a vinyl ether (P1900). The molar ratio of reactive unsaturations to vinyl ether groups is approximately 1:0.5. The particulate composition comprises 3.6 wt % of mBPO as thermal radical initiator (T.R.I.) dispersed or dissolved in the resin component. In some experiments 250 ppm of hydroquinone as a retardant is dissolved in the resin component. All ingredients are mixed via extrusion.

The stability of each particulate composition is determined by measuring the change in reaction enthalpy ($\Delta H_r$) after storing the particulate composition for the indicated time and at the indicated temperature. The reaction enthalpy is measured by heating the particulate composition from 0 to 200° C. at 5° C./min and measuring the curing exotherm above 100° C. via DSC. A particulate composition that has undergone more pre-reaction will have a lower reaction enthalpy. Therefore, a larger reduction in reaction enthalpy is indicative of reduced stability of the particulate composition.

The results are shown in Table 1.

TABLE 1

| | | Example 1 Results | | |
| --- | --- | --- | --- | --- |
| Ex. | Retardant | $\Delta H_r$ (J/g) 1 week at Room Temp | $\Delta H_r$ (J/g) 1 day at 40° C. | $\Delta H_r$ (J/g) 1 day at 70° C. |
| Ex1 | Dissolved | 130.9 | 128.7 | 101.5 |
| CE1 | None | 135.0 | 135.2 | 87.7 |

The inclusion of the dissolved retardant results in a lower reduction in $\Delta H_r$ when the particulate composition is stored at 70° C. for 1 day. At industrial scale, the useful extruders operate at higher temperatures than the extruders used to form the particulate compositions in this application. A high reduction in $\Delta H_r$ may predict undesirable gelling or pre-curing in industrial extruders.

Example 2—Properties of Cured Systems Comprising a Dispersed or Dissolved Initiator Various particulate compositions are formed. The particles comprise a resin component comprising an amorphous unsaturated polyester (UPE1010) and a vinyl ether (P1900). The molar ratio of reactive unsaturations to vinyl ether groups is approximately 1:0.5. 3.6 wt % of mBPO as thermal radical initiator (T.R.I.) is either dispersed or dissolved in the resin component ("D"), absent ("-"), or blended as a separate particulate ("B"). 250 ppm of hydroquinone as a retardant is either dissolved in the resin component ("D") or absent ("-"). The tested liquid compositions consist of the specified accelerator or TRI at the stated wt %, based on the total weight of the liquid composition, and a liquid polymerizable component as the remainder. If a fumarate is present, the materials making up the liquid polymerizable component are present in the stated molar ratio of vinyl ether groups to fumarate groups.

Films are formed as described previously. An acetone spot test is performed. Results are shown in Table 2.

TABLE 2

Example 2 Results

| | Particulate Composition | | | Liquid Composition | | | | | |
|---|---|---|---|---|---|---|---|---|---|
| Ex. | TRI | Retardant | Accel. | Accel. | Liquid Polymerizable Component | TRI | Amount (wt. %) | Temp (° C.) | AST |
| Ex2.1 | D | D | — | 1 wt. % DMPT | DEGDVE | — | 23, 13 | 80 | + |
| Ex2.2 | D | D | — | 0.5 wt. % DMPT | CHDVE | — | 23 | 80 | + |
| Ex2.3 | D | D | — | 1 wt. % DMPT | CHDVE/DEF (1:1) | — | 23, 21, 25 | 23 | +/− |
| Ex2.4 | D | D | — | 1 wt. % DMPT | CHDVE/DEF (1:1) | — | 24, 22, 24 | 50 | +/− |
| CE2.1 | B | — | — | 1 wt. % DMPT | DEGDVE | — | 22 | 80 | — |
| CE2.2 | B | — | — | 1 wt. % DMPT | DEGDVE/DEF (1:1) | — | 24 | 80 | — |
| CE2.3 | — | — | — | 1 wt. % DMPT | DEGDVE | — | 28 | 80 | — |
| CE2.4 | — | — | — | — | CHDVE | 3 wt. % LPO | 26 | 80 | — |
| CE2.5 | — | — | B, 1 wt. % DMPT | — | CHDVE | 3 wt. % LPO | 23 | 80 | — |

A system with a dissolved TRI receives a + in the AST, but an otherwise identical system receives a—(Ex2.1 vs. CE2.1). Placing the thermal radical initiator in the liquid composition yields a—on the AST (CE2.4), even when an accelerator is blended into the particulate composition (CE2.5).

Example 3—Effect of Resin Polymerizable Group(s) on Film Properties

Various particulate compositions are formed. 3.6 wt % of mBPO as thermal radical initiator (T.R.I.) is either dissolved in the resin component ("D") or blended as a separate particulate ("B"). 250 ppm of hydroquinone as a retardant is either dissolved in the resin component via extrusion ("D") or absent ("-"). The stated resin component makes up the balance of the particulate composition. In the case that the resin component comprises both an unsaturated polyester and a vinyl ether, the molar ratio of reactive unsaturations to vinyl ether groups is approximately as stated.

The tested liquid compositions consist of the specified accelerator at the stated wt %, based on the total weight of the liquid composition, and a liquid polymerizable component as the remainder. If a fumarate is present, the materials making up the liquid polymerizable component are present in the stated molar ratio of vinyl ether groups to fumarate groups.

Films are formed as described previously. An acetone spot test is performed. Results are shown in Table 3.

TABLE 3

Example 3 Results

| | Particulate Composition | | | | Liquid Composition | | | |
|---|---|---|---|---|---|---|---|---|
| Ex. | Resin Component | TRI | Retardant | Accelerator | Liquid Polymerizable Component | Amount (wt. %) | Temp (° C.) | AST |
| Ex3.1 | UPE1010/P1 900 (1:1) | D | D | 1 wt. % DMPT | DEGDVE/DEF (1:1) | 20, 25, 20 | 80 | + |
| Ex3.2 | UPE1010/P1 900 (1:0.5) | D | D | 1 wt. % DMPT | DEGDVE | 23, 13 | 80 | + |
| Ex3.3 | UPE1010 | D | D | 1 wt. % DMPT | DEGDVE | 32, 31, 24 | 23 | + |
| Ex3.4 | UPE1010 | D | D | 1 wt. % DMPT | DEGDVE | 22, 25, 19 | 50 | + |
| CE3.1 | Non-functional PE | B | — | 1 wt. % DMPT | DEGDVE/DEF (1:1) | 18 | 80 | − |
| CE3.2 | Non-functional PE | B | — | 1 wt. % DMPT | DEGDVE/DEF (1:1) | 21, 18, 20 | 80 | − |
| CE3.3 | Non-functional PE | B | — | 1 wt. % DMPT | DEGDVE | 14 | 80 | − |
| CE3.4 | Non-functional PE | D | D | 1 wt. % DMPT | DEGDVE/DEF (1:1) | 16 | 80 | − |

The examples with functional resin components show superior performance in the AST relative to the examples with non-functional resin components.

Example 4—Properties of Cured Films Comprising Amorphous Resin Components

Various particulate compositions are formed. 3.6 wt % of mBPO as thermal radical initiator (T.R.I.) and 250 ppm of hydroquinone as a retardant is dispersed or dissolved in the resin component via extrusion. The stated resin component makes up the balance of the particulate composition. In the case that the resin component comprises both an unsaturated polyester and a vinyl ether, the molar ratio of reactive unsaturations to vinyl ether groups is approximately as stated.

The tested liquid compositions consist of the specified accelerator at the stated wt %, based on the total weight of the liquid composition, and a liquid polymerizable component as the remainder. If a fumarate is present, the materials making up the liquid polymerizable component are present in the stated molar ratio of vinyl ether groups to fumarate groups. Films are formed as described previously. Examples 4.8 and 4.9 are cured under nitrogen. An acetone spot test and DMA is performed. Results are shown in Table 4.1 and Table 4.2. Example 4.10 and 4.11 failed the AST, likely due to oxygen inhibition. It is expected that the systems would pass the AST if cured under nitrogen.

TABLE 4.1

Example 4 Results Part 1

| | Particulate Composition | | Liquid Composition | | | | | DMA | | | |
|---|---|---|---|---|---|---|---|---|---|---|---|
| Ex. | Resin Component | Accel. | Liquid Polymerizable Component | Amount (wt. %) | Temp (° C.) | Post Cure | AST | E' at 23° C. (MPa) | E' at 150° C. (MPa) | Tg (E") (° C.) | tan δ max (° C.) |
| Ex4.1 | UPE1010 | 1 wt. % DMPT | DEGDVE | 32, 31, 24 wet | 23, 50 | None | + | 547 | 8 | <0 | 46 |
| Ex4.2 | UPE1010 | 1 wt. % DMPT | DEGDVE | 22, 25, 19 wet | 50, 60 | 30 min @ 120° C. | + | 1200 | 9 | 32 | 50 |
| Ex4.3 | UPE1010/ P1900 (1:1) | 1 wt. % DMPT | DEGDVE/ DEF (1:1) | 20, 25, 20 | 80 | 30 min @ 120° C. | + | 1432 | 19 | 28 | 70 |
| Ex4.4 | UPE1010/ P1900 (1:0.5) | 0.5 wt. % DMPT | DEGDVE | 23, 13 | 80 | 30 min @ 120° C. | + | 1778 | 19 | 30 | 70 |
| Ex4.5 | UPE1010/ P1900 (1:0.5) | 1 wt. % DMPT | CHDVE | 23 | 80 | None | + | n.t. | n.t. | n.t. | n.t. |
| Ex4.6 | UPE1010/ P1900 (1:0.5) | — | DEGDVE | 18, 20, 23 | 100 | 30 min @ 120° C. | + | 1960 | 35 | 37 | 68 |
| Ex4.7 | UPE1010/ P1900 (1:0.5) | — | DEGDVE | 17, 20, 13 | 100 | none | + | n.t. | n.t. | n.t. | n.t. |

TABLE 4.2

Example 4 Results Part 2

| | Particulate Composition | | Liquid Composition | | | | | DMA | | | |
|---|---|---|---|---|---|---|---|---|---|---|---|
| Ex. | Resin Component | Accel. | Liquid Polymerizable Component | Amount (wt. %) | Temp (° C.) | Post Cure | AST | E' at 23° C. (MPa) | E' at 150° C. (MPa) | Tg (E") (° C.) | tan δ max (° C.) |
| Ex4.8 | SOEA | 1 wt. % DEA + 0.5 wt. % NL-49 | CTFA | 39 | 40 | 1 hr @ 80° C. | + | 1722 | 1 | 41 | 60 |
| Ex4.9 | SOEA | 2 wt. % DEA + 0.5 wt. % NL-49 | CTFA | n.t. | 40 | 1 hr @ 80° C. | + | 1286 | 1 | 37 | 58 |
| Ex4.10 | UVECOAT | 0.5 wt. % DMPT | IBOA | 25 | 80 | 30 min @ 120° C. | − | n.t. | n.t. | n.t. | n.t. |
| Ex4.11 | SOEA | 0.5 wt. % DMPT | IBOA | 26 | 80 | 30 min @ 120° C. | − | n.t. | n.t. | n.t. | n.t. |

Example 5—Properties of Cured Films Having Only Crystalline or Semi-Crystalline Unsaturated Polyester Resin Components Various particulate compositions are formed. 3.6 wt % of mBPO as thermal radical initiator (T.R.I.) and 250 ppm of hydroquinone as a retardant is dissolved in the resin component via extrusion, except for in Example 5.5 where 2 wt % of tBu-peroxybenzoate as TRI and 130 ppm 2,6-Di-tert-butyl-4-methylphenol as retardant are dissolved in the resin component. The stated resin component makes up the balance of the particulate composition. In the case that the resin component comprises both an unsaturated polyester and a vinyl ether, the molar ratio of reactive unsaturations to vinyl ether groups is approximately as stated.

Liquid compositions are formed by simple mixing. The tested liquid compositions consist of the specified accelerator at the stated wt %, based on the total weight of the liquid composition, and a liquid polymerizable component as the remainder. If a fumarate is present, the materials making up the liquid polymerizable component are present in the stated molar ratio of vinyl ether groups to fumarate groups.

Films are formed as described previously. Example 5.7 was cured under nitrogen. An acetone spot test is carried out. Results are shown in Table 5.

TABLE 5

Example 5 Results

| | Particulate Composition | | Liquid Composition | | | | | DMA | | | |
|---|---|---|---|---|---|---|---|---|---|---|---|
| Ex. | Resin Component | Accel. | Liquid Polymerizable Component | Amount (wt. %) | Temp (° C.) | Post Cure | AST | E' at 23° C. (MPa) | E' at 150° C. (MPa) | Tg (E") (° C.) | tan δ max (° C.) |
| Ex5.1 | UPEcrys/ P1900 (1:1) | 0.5 wt. % DMPT | CHDVE/ DEF (1:1) | 20 | 110 | 30 min @ 120° C. | + | 57 | 6 | <0 | 12 |
| Ex5.2 | UPEcrys/ P1900(1:0.5) | 0.5 wt. % DMPT | CHDVE | 26 | 110 | 30 min @ 120° C. | + | 53 | n.t. | −3 | 6 |
| Ex5.3 | UPEcrys | 0.5 wt. % DMPT | CHDVE | 25 | 110 | 30 min @ 120° C. | + | 79 | 4 | <0 | 12 |
| Ex5.4 | UPEcrys | — | DEGDVE | 25 | 100 | None | + | n.t. | n.t. | n.t. | n.t. |
| Ex5.5 | PU-ma | 1 wt. % NL-49 | HEMA | 13 | 130 | None | + | 2100 | 29 | 35 | 82 |
| Ex5.6 | PE-U-ma | 0.5 wt. % DMPT | IBOA | 38 | 80 | 30 min @ 120° C. | +/− | 833 | 1 | 18 | 25 |
| Ex5.7 | PE-U-ma | 1 wt. % DMPT | NBUA | 36 | 100 | 60 min @ 100° C. | + | 273 | 3 | 15 | 34 |

It is possible to form rubbery films from by selectively dispensing a liquid composition onto a layer of a particulate composition comprising an unsaturated semi-crystalline polyester.

Additional Description of Exemplary Embodiments

1) A method of forming a three-dimensional object comprising the steps of:
   a. forming a layer of a particulate composition, the particulate composition comprising a plurality of first particles that comprise:
      i. a resin component comprising a first resin, the first resin comprising a first resin polymerizable group, the first resin polymerizable group comprising a carbon-carbon double bond directly attached to an electron withdrawing group,
      ii. a thermal radical initiator dispersed or dissolved in the resin component, and
      iii. a retardant dispersed or dissolved in the resin component;
   b. selectively depositing a liquid composition onto the layer of the particulate composition in accordance with computer data corresponding to the shape of at least a portion of a three-dimensional object, the liquid composition comprising:
      i. a first liquid polymerizable component, the first liquid polymerizable component comprising a first liquid polymerizable group, the first liquid polymerizable group comprising a carbon-carbon double bond that is able to (co)polymerize with the first resin polymerizable group;
   c. optionally applying electromagnetic radiation to a plurality of the locations of the layer of the particulate composition where the liquid composition has been selectively deposited;
   d. activating the thermal radical initiator in a plurality of the locations of the layer of the particulate composition where the liquid composition has been selectively deposited; and
   e. repeating steps a-d a plurality of times to form a three-dimensional object.

2) A kit of materials for forming an object by an additive fabrication process comprising:
   a. a particulate composition comprising a plurality of first particles that comprise:
      i. a resin component comprising a first resin, the first resin comprising a first resin polymerizable group, the first resin polymerizable group comprising a carbon-carbon double bond directly attached to an electron withdrawing group,
      ii. a thermal radical initiator dispersed or dissolved in the resin component, and
      iii. a retardant dispersed or dissolved in the resin component; and
   b. a liquid composition comprising:
      i. a first liquid polymerizable component, the first liquid polymerizable component comprising a first liquid polymerizable group, the first liquid polymerizable group comprising a carbon-carbon double bond that is able to (co)polymerize with the first resin polymerizable group.

3) The method or kit according to any one of the preceding exemplary embodiments, wherein the thermal radical initiator generates sufficient radicals to initiate polymerization of the first resin within two hours when the thermal radical initiator is exposed to a temperature greater than or equal to an activation temperature and the activation temperature is greater than 30° C.
4) The method or kit according to any one of the preceding exemplary embodiments, wherein the retardant inhibits the onset of polymerization of the first particle polymerizable group in response to radicals generated by the thermal radical initiator.
5) The method or kit according to any one of the preceding exemplary embodiments, wherein the plurality of first particles have a mean particle diameter of from 10 to 100 μm as measured by laser diffraction in accordance with ISO13320 (2009).
6) The method or kit according to any one of the preceding exemplary embodiments, wherein the plurality of first particles have a mean particle diameter of from 30 to 80 μm as measured by laser diffraction in accordance with ISO13320 (2009).
7) The method or kit according to any one of the preceding exemplary embodiments, wherein the liquid composition further comprises an accelerator for the thermal radical initiator.
8) The method or kit according to any one of the preceding exemplary embodiments, wherein when the accelerator comes in contact with the thermal radical initiator, the thermal radical initiator is able to generate radicals at a temperature that is lower than the temperature at which the thermal radical initiator is able to generate radicals in the absence of the accelerator.
9) The method or kit according to any one of the preceding exemplary embodiments, wherein the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is at least 10° C.
10) The method or kit according to any one of the preceding exemplary embodiments, wherein the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 200° C.
11) The method or kit according to any one of the preceding exemplary embodiments, wherein the difference between the temperature at which the thermal radical initiator has a half-life of 6 minutes or less when the thermal radical initiator is not in contact with the accelerator and the temperature at which the thermal radical initiator has a half-life of 6 minutes or less when the thermal radical initiator is in contact with the accelerator is from 30° C. to 100° C.
12) The method or kit according to any one of the preceding exemplary embodiments, wherein the temperature at which the thermal radical initiator has a half-life of 6 minutes or less when the thermal radical initiator is not in contact with the accelerator is 60° C. or higher and the temperature at which the thermal radical initiator has a half-life of 6 minutes or less when the thermal radical initiator is in contact with the accelerator is 50° C. or less.
13) The method or kit according to any one of the preceding exemplary embodiments, wherein the temperature at which the thermal radical initiator has a half-life of 6 minutes or less when the thermal radical initiator is not in contact with the accelerator is 70° C. or higher and the temperature at which the thermal radical initiator has a half-life of 6 minutes or less when the thermal radical initiator is in contact with the accelerator is 40° C. or less.
14) The method or kit according to any one of the preceding exemplary embodiments, wherein the temperature at which the thermal radical initiator has a half-life of 6 minutes or less when the thermal radical initiator is not in contact with the accelerator is 100° C. or higher and the temperature at which the thermal radical initiator has a half-life of 6 minutes or less when the thermal radical initiator is in contact with the accelerator is 50° C. or less.
15) The method or kit according to any one of the preceding exemplary embodiments, wherein the temperature at which the thermal radical initiator has a half-life of 6 minutes or less when the thermal radical initiator is in contact with the accelerator is from 20° C. to 50° C.
16) The method or kit according to any one of the preceding exemplary embodiments, wherein the first resin polymerizable group comprises an acrylate, methacrylate, fumarate, maleate, itaconate, citraconate, or mesaconate.
17) The method or kit according to any one of the preceding exemplary embodiments, wherein the first resin polymerizable group comprises a methacrylate, fumarate, maleate, or itaconate.
18) The method or kit according to any one of the preceding exemplary embodiments, wherein the first resin comprises a backbone, the backbone comprising the reaction product of a polyacid and a polyol.
19) The method or kit according to any one of the preceding exemplary embodiments, wherein the first resin comprises a backbone, the backbone comprising the reaction product of a polyacid and a polyol, and wherein the polyacid comprises terephthalic acid, isophthalic acid, or phthalic acid.
20) The method or kit according to any one of the preceding exemplary embodiments, wherein at least 20 mol %, at least 30 mol %, at least 40 mol %, at least 50 mol %, at least 60 mol %, at least 70 mol %, at least 75 mol %, at least 80 mol %, at least 85 mol %, at least 90 mol %, at least 95 mol %, at least 98 mol %, or 100 mol % of the backbone of the first resin comprises the reaction product of a polyacid and a polyol.
21) The method or kit according to any one of the preceding exemplary embodiments, wherein at least 20 mol %, at least 30 mol %, at least 40 mol %, at least 50 mol %, at least 60 mol %, at least 70 mol %, at least 75 mol %, at least 80 mol %, at least 85 mol %, at least 90 mol %, at least 95 mol %, at least 98 mol %, or 100 mol % of the backbone of the first resin comprises the reaction product of terephthalic acid and a polyol.
22) The method or kit according to any one of the preceding exemplary embodiments, wherein at most 100 mol %, at most 98 mol %, at most 95 mol %, at most 90 mol %, at most 80 mol %, at most 70 mol %, or at most 60 mol % of the backbone of the first resin comprises the reaction product of terephthalic acid and a polyol.

23) The method or kit according to any one of the preceding exemplary embodiments wherein the particulate composition comprises from 40 to 100 wt % of first particles.

24) The method or kit according to any one of the preceding exemplary embodiments wherein the particulate composition comprises from 50 to 99 wt % of first particles.

25) The method or kit according to any one of the preceding exemplary embodiments wherein the particulate composition further comprises a flow modifier, a non-reactive filler, a stabilizer, a further reactive organic particles, or a colorant.

26) The method or kit according to any one of the preceding exemplary embodiments, wherein the particulate composition further comprises from 10 to 35 wt % of a non-reactive filler.

27) The method or kit according to any one of the preceding exemplary embodiments, wherein the average number of first resin polymerizable groups is at least 1, at least 1.5, at least 2, equal to 2, at least 2.01, at least 2.05, at least 2.10, at least 2.12, at least 2.15, at least 2.20, at least 2.30, at least 2.35, or at least 2.40.

28) The method or kit according to any one of the preceding exemplary embodiments, wherein the average number of first resin polymerizable groups is at most 10, at most 9, at most 8, at most 7, at most 6, at most 5, at most 5.5, at most 5, at most 4.5, at most 4, at most 3.80, or at most 3.50.

29) The method or kit according to any one of the preceding exemplary embodiments, wherein the first resin is telechelic.

30) The method or kit according to any one of the preceding exemplary embodiments, wherein the first resin is telechelic and comprises at least two first resin polymerizable groups as endgroups.

31) The method or kit according to any one of the preceding exemplary embodiments, wherein the first resin is telechelic and comprises from 2 to 3 first resin polymerizable groups as endgroups.

32) The method or kit according to any one of the preceding exemplary embodiments, wherein the first resin is telechelic and comprises at least two first resin polymerizable groups as endgroups, and the first resin polymerizable groups comprise a (meth)acrylate group.

33) The method or kit according to any one of the preceding exemplary embodiments, wherein the first resin has a Mn of at least 800, at least 1000, at least 1500, at least 1800, at least 2000, or at least 2300 Da.

34) The method or kit according to any one of the preceding exemplary embodiments, wherein the first resin has a Mn of at most 20000, at most 10000, at most 9000, at most 8000, at most 7000, at most 6000, or at most 5000 Da. In an embodiment, the first resin has a Mn of at least 2000 and at most 8000 Da.

35) The method or kit according to any one of the preceding exemplary embodiments, wherein the $M_n$ of the resin component divided by the average number of polymerizable groups in each molecule of the resin component is at least 150, at least 180, at least 200, at least 250, at least 300, at least 350, at least 400, at least 450, or at least 500 g/mol.

36) The method or kit according to any one of the preceding exemplary embodiments, wherein the $M_n$ of the resin component divided by the average number of polymerizable groups in each molecule of the resin component is at most 3000, at most 2000, at most 1500, at most 1300, at most 1200, at most 1100, at most 1000, at most 900, at most 850, at most 800 g/mol.

37) The method or kit according to any one of the preceding exemplary embodiments, wherein the first resin is amorphous and has a glass transition temperature ($T_g$) of at least 20, at least 25, at least 30, at least 40, at least 45, or at least 50° C.

38) The method or kit according to any one of the preceding exemplary embodiments, wherein the first resin is amorphous and has a glass transition temperature ($T_g$) of at most 120, at most 110, at most 100, at most 90, at most 80, at most 75, at most 70, at most 65, or at most 60° C.

39) The method or kit according to any one of the preceding exemplary embodiments, wherein the first resin is crystalline and has a glass transition temperature ($T_g$) of at least −70, at least −50, at least −40, at least −35, at least −20, at least −10, at least 0, at least 10, or at least 20° C.

40) The method or kit according to any one of the preceding exemplary embodiments, wherein the first resin is crystalline and has a glass transition temperature ($T_g$) of at most 120, at most 110, at most 100, at most 90, at most 80, at most 75, at most 70, at most 60, or at most 50° C.

41) The method or kit according to any one of the preceding exemplary embodiments, wherein the first resin is crystalline and has a melting temperature ($T_m$) of at least 30, at least 40, at least 50, or at least 60° C.

42) The method or kit according to any one of the preceding exemplary embodiments, wherein the first resin is crystalline and has a melting temperature ($T_m$) of at most 200, at most 180, at most 160, at most 140, at most 130, at most 120, or at most 110° C.

43) The method or kit according to any one of the preceding exemplary embodiments, wherein the resin component further comprises a second resin, the second resin comprising a second resin polymerizable group, the second resin polymerizable group comprising a carbon-carbon double bond directly attached to an electron donating group.

44) The method or kit according to any one of the preceding exemplary embodiments, wherein the resin component comprises a crystalline resin comprising a carbon-carbon double bond directly attached to an electron donating group and an amorphous resin comprising a carbon-carbon double bond directly attached to an electron withdrawing group.

45) The method or kit according to any one of the preceding exemplary embodiments, wherein the resin component comprises only amorphous resins having a Tg of from 20 to 120° C.

46) The method or kit according to any one of the preceding exemplary embodiments, wherein the resin component comprises one or more crystalline resins having a melting temperature of from 40 to 120° C.

47) The method or kit according to any one of the preceding exemplary embodiments, wherein the resin component comprises a crystalline vinyl ether having a melting temperature of at least 40° C.

48) The method or kit according to any one of the preceding exemplary embodiments, wherein when the particulate composition is in contact with the liquid composition, the resin component comprises a resin that has a melting temperature that is less than or equal to the activation temperature of the thermal radical initiator.
49) The method or kit according to any one of the preceding exemplary embodiments, wherein the second resin polymerizable group comprises a vinyl ether.
50) The method or kit according to any one of the preceding exemplary embodiments, wherein the second resin comprises a mono vinyl ether.
51) The method or kit according to any one of the preceding exemplary embodiments, wherein the second resin comprises a di vinyl ether.
52) The method or kit according to any one of the preceding exemplary embodiments, wherein the resin component comprises one or more resins having a number average molecular weight ($M_e$) of from 1000 to 5000 g/mol.
53) The method or kit according to any one of the preceding exemplary embodiments, wherein the first liquid polymerizable group comprises an acrylate group, a methacrylate group, or a carbon-carbon double bond directly attached to an electron donating group.
54) The method or kit according to any one of the preceding exemplary embodiments, wherein the first liquid polymerizable group comprises a vinyl ether, vinyl ester, or vinyl amine.
55) The method or kit according to any one of the preceding exemplary embodiments, wherein the first liquid polymerizable group comprises a vinyl ether.
56) The method or kit according to any one of the preceding exemplary embodiments, wherein the liquid composition further comprises a second liquid polymerizable component, the second liquid polymerizable component comprising a second liquid polymerizable group, the second liquid polymerizable group comprising a carbon-carbon double bond directly attached to an electron withdrawing group.
57) The method or kit according to any one of the preceding exemplary embodiments, wherein the second liquid polymerizable group is able to (co)polymerize with the first liquid polymerizable group.
58) The method or kit according to any one of the preceding exemplary embodiments, wherein the second liquid polymerizable group is able to (co)polymerize with the first resin polymerizable group and/or the second resin polymerizable group if present.
59) The method or kit according to any one of the preceding exemplary embodiments, wherein the first resin polymerizable group comprises a (meth)acrylate, and the first liquid polymerizable group comprises a (meth)acrylate.
60) The method or kit according to any one of the preceding exemplary embodiments, wherein the first resin comprises a polyester (meth)acrylate, the first resin polymerizable group comprises a (meth)acrylate, and the first liquid polymerizable group comprises a (meth)acrylate.
61) The method or kit according to any one of the preceding exemplary embodiments, wherein the first resin comprises an unsaturated polyester and the first liquid polymerizable group is a vinyl ether.
62) The method or kit according to any one of the preceding exemplary embodiments, wherein the resin polymerizable group comprises an acrylate, the first liquid polymerizable group comprises a vinyl ether, and the second liquid polymerizable group comprises a fumarate.
63) The method or kit according to any one of the preceding exemplary embodiments, wherein the resin component comprises a first resin and a second resin, the second resin comprising a second resin polymerizable group, the first resin comprising an unsaturated polyester, the second resin polymerizable group comprising a vinyl ether, and the liquid polymerizable group comprising a vinyl ether.
64) The method or kit according to any one of the preceding exemplary embodiments, wherein the resin component comprises a first resin and a second resin, the second resin comprising a second resin polymerizable group, the first resin comprising an unsaturated polyester, the second resin polymerizable group comprising a vinyl ether, and the liquid composition comprising a second liquid polymerizable component comprising a second liquid polymerizable group, the first liquid polymerizable group comprising a vinyl ether and the second liquid polymerizable group comprising a fumarate.
65) The method or kit according to any one of the preceding exemplary embodiments, wherein the resin component comprises a first resin and a second resin, the second resin comprising a second resin polymerizable group, wherein the first resin is not able to copolymerize with the second resin.
66) The method or kit according to any one of the preceding exemplary embodiments, wherein the resin component comprises a first resin and a second resin, the second resin comprising a second resin polymerizable group, wherein the first resin is not able to copolymerize with the second resin, and wherein the second resin polymerizable group comprises an epoxy.
67) The method or kit according to any one of the preceding exemplary embodiments, wherein the resin component further comprises a second resin comprising a second resin polymerizable group, and wherein the first resin polymerizable group is a (meth)acrylate and the second resin polymerizable group comprises an epoxy.
68) The method or kit according to any one of the preceding exemplary embodiments, wherein the second liquid polymerizable group comprises an acrylate, methacrylate, fumarate, maleate, or itaconate.
69) The method or kit according to any one of the preceding exemplary embodiments, wherein the second liquid polymerizable group comprises a fumarate or itaconate.
70) The method or kit according to any one of the preceding exemplary embodiments, wherein the liquid composition further comprises a second liquid polymerizable component comprising a second liquid polymerizable group and the second liquid polymerizable group is not able to (co)polymerize with the first liquid polymerizable group.
71) The method or kit according to any one of the preceding exemplary embodiments, wherein the liquid composition further comprises a second liquid polymerizable component comprising a second liquid polymerizable group and the second liquid polymerizable group comprises an epoxy or an oxetane.
72) The method or kit according to any one of the preceding exemplary embodiments, wherein the thermal radical initiator comprises a peroxide.
73) The method or kit according to any one of the preceding exemplary embodiments, wherein the thermal radical initiator comprises a peranhydride, perester, perether, percarbonate, or hydroperoxide.
74) The method or kit according to any one the preceding exemplary embodiments, wherein the thermal radical initiator comprises a peranhydride, perester, or percarbonate.
75) The method or kit according to any one of the preceding exemplary embodiments, wherein the accelerator comprises an aromatic tertiary amine.
76) The method or kit according to any one of the preceding exemplary embodiments, wherein the aromatic tertiary amine comprises an N'N'dialkyl aromatic amine, an aromatic tertiary amine comprising an electron donating group directly attached to an aromatic ring, or an aromatic tertiary amine comprising a β-hydroxy alkyl attached to the tertiary amine.
77) The method or kit according to any one of the preceding exemplary embodiments, wherein the aromatic tertiary amine comprises diisopropanol-p-toluidine.
78) The method or kit according to any one of the preceding exemplary embodiments, wherein the retardant comprises a phenolic compound.
79) The method or kit according to any one of the preceding exemplary embodiments, wherein the retardant comprises 2-methyl hydroquinone or 2-t-butyl hydroquinone.
80) The method or kit according to any one the preceding exemplary embodiments, wherein the liquid composition further comprises a liquid radical initiator.
81) The method or kit according to any one of the preceding exemplary embodiments, wherein the liquid radical initiator comprises a thermal radical initiator or a radical photo-initiator.
82) The method or kit according to any one of the preceding exemplary embodiments, wherein the liquid radical initiator comprises a thermal radical initiator.
83) The method or kit according to any one of the preceding exemplary embodiments, wherein the liquid radical initiator comprises a radical photo-initiator.
84) The method or kit according to any one of the preceding exemplary embodiments, wherein the plurality of first particles further comprise a non-reactive polymer having a number average molecular weight of 1000 to 20,000 g/mol.
85) The method or kit according to any one of the preceding exemplary embodiments, wherein the accelerator comprises a transition metal catalyst.
86) The method or kit according to any one of the preceding exemplary embodiments, wherein the transition metal catalyst comprises a transition metal salt or transition metal complex.
87) The method or kit according to any one of the preceding exemplary embodiments, wherein the transition metal catalyst comprises Co, Mn, Cu, Fe, V, or Ti.
88) The method or kit according to any one of the preceding exemplary embodiments, wherein the liquid composition further comprises a plasticizer.
89) The method or kit according to any one of the preceding exemplary embodiments, wherein the liquid composition further comprises a plasticizer and the plasticizer comprises a polyalkylene ether.
90) The method of any one of the preceding exemplary embodiments, wherein the liquid composition is selectively dispensed onto the layer of the particulate composition in accordance with a plurality of voxels representing a portion of the three-dimensional object.
91) The method according to any one of the preceding exemplary embodiments, wherein the molar ratio of vinyl ether groups to fumarate and maleate groups per voxel is from 5:1 to 1:5.
92) The method according to any one of the preceding exemplary embodiments, wherein the molar ratio of vinyl ether groups to fumarate and maleate groups per voxel is from 1.5:1 to 1:1.5.
93) The method according to any one of the preceding exemplary embodiments, wherein the molar ratio of vinyl ether groups to fumarate and maleate groups per voxel is from 1.1:1 to 1:1.1.
94) The method according to any one of the preceding exemplary embodiments, wherein the molar ratio of methacrylate groups to vinyl ether groups to fumarate and maleate groups per voxel is from 4.5:2.5:1 to 3.5:1.5:1.
95) The method according to any one of the preceding exemplary embodiments, wherein the ratio of weight of the particulate composition to weight of the liquid composition per voxel is from 30:70 to 70:30.
96) The method according to any one of the preceding exemplary embodiments, wherein the ratio of weight of the particulate composition to weight of the liquid composition per voxel is from 95:5 to 50:50.
97) The method or kit according to any one of the preceding exemplary embodiments, wherein the activation temperature of the thermal radical initiator is greater than 40° C.
98) The method or kit according to any one of the preceding exemplary embodiments, wherein the activation temperature of the thermal radical initiator is greater than 50° C.
99) The method or kit according to any one of the preceding exemplary embodiments, wherein the particulate composition further comprises a plurality of second particles comprising a further resin component and devoid of a thermal radical initiator dispersed or dissolved in the further resin component, wherein the further resin component is the same or different than the resin component, and wherein the further resin component is able to (co)polymerize with the resin component.
100) The method or kit of any one of the preceding exemplary embodiments, wherein the particulate composition further comprises a plurality of second particles that comprise a further resin component that is different from the resin component and is not able to (co)polymerize with the resin component, and a further thermal initiator dispersed or dissolved in the further resin component for initiating polymerization of the further resin component.
101) The method or kit of any one of the preceding exemplary embodiments, wherein the particulate composition further comprises a plurality of second particles that comprise a further resin component that is different from the resin component and is not able to (co)polymerize with the resin component, and a further thermal initiator dispersed or dissolved in the further resin component for initiating polymerization of the further resin component.
102) The method according to any one of the preceding exemplary embodiments, wherein the thermal radical initiator is activated by temporarily increasing the local temperature to the activation temperature or higher by the application of electromagnetic radiation to a plurality of the locations of the layer of the particulate composition where the liquid composition has been selectively deposited.
103) The method according to any one of the preceding exemplary embodiments, wherein the liquid composition further comprises an accelerator, wherein the particulate composition has a dry temperature, the dry temperature being the temperature at the surface of the layer of the particulate composition, and wherein when the liquid composition contacts the particulate composition the activation temperature of the thermal radical initiator is reduced to be lower than the dry temperature, thereby causing activation of the thermal radical initiator.
104) The method according to any one of the preceding exemplary embodiments, further comprising melting the first resin in a plurality of locations of the layer of the particulate composition where the liquid composition has been selectively deposited.
105) The method according to any one of the preceding exemplary embodiments, further comprising melting the first resin in a plurality of locations of the layer of the particulate composition where the liquid composition has been selectively deposited prior to activating the thermal radical initiator.
106) The method according to any one of the preceding exemplary embodiments, further comprising melting the first resin in a plurality of locations of the layer of the particulate composition where the liquid composition has been selectively deposited contemporaneously with the activation of the thermal radical initiator.
107) The method according to any one of the preceding exemplary embodiments, wherein the first resin melts at a temperature that is less than or equal to the dry temperature when the particulate composition is in contact with the liquid composition, but does not melt at the dry temperature when the particulate composition is not in contact with the liquid composition.
108) The method according to any one of the preceding exemplary embodiments, further comprising melting the first resin in a plurality of locations of the layer of the particulate composition where the liquid composition has been selectively deposited, and wherein melting is accomplished by use of a first resin that is crystalline or semi-crystalline such that the melting point(s) of the first resin are reduced when the first resin comes into contact with the liquid composition.
109) The method according to any one of the preceding exemplary embodiments, further comprising melting the first resin in a plurality of locations of the layer of the particulate composition where the liquid composition has been selectively deposited, and wherein melting is accomplished by increasing the local temperature at a plurality of the locations of the layer of the particulate composition where the liquid composition has been selectively deposited by applying electromagnetic radiation.
110) The method according to any one of the preceding exemplary embodiments, wherein electromagnetic radiation is applied to substantially all locations of the layer of the particulate composition where the liquid composition has been selectively deposited.
111) The method according to any one of the preceding exemplary embodiments, wherein electromagnetic radiation is applied to all locations of the layer of the particulate composition where the liquid composition has been selectively deposited.
112) The method of any one of the preceding exemplary embodiments, wherein the liquid composition further comprises an absorber and the step of optionally applying electromagnetic radiation to a plurality of the locations of the layer of the particulate composition wherein the liquid composition has been selectively deposited is carried out.
113) The method of any one of the preceding exemplary embodiments, further comprising the step of selectively depositing an inhibitor to the particulate composition.
114) The method of any one of the preceding exemplary embodiments, further comprising the step of selectively depositing an inhibitor to the particulate composition, wherein the inhibitor is a retardant, a reflector, or a barrier.
115) A three-dimensional object formed from the method or kit of any one of the preceding embodiments.
116) A method of forming a three-dimensional object comprising the steps of
   a. forming a mold by the method of any one of the preceding embodiments, and
   b. using the mold to form a three-dimensional object.
117) A method of forming a three-dimensional object comprising the steps of
   a. providing a mold formed by the method of any one of the preceding embodiments, and
   b. using the mold to form a three-dimensional object.
118) The method of any one of the preceding exemplary embodiments, wherein step c is carried out.
119) The method of any one of the preceding exemplary embodiments, wherein step c is carried out and the electromagnetic radiation comprises infrared light, UV light, electromagnetic radiation having a wavelength of from 340 to 415 nm, and/or electromagnetic radiation having a wavelength of from 700 to 1500 nm.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. While certain optional features are described as embodiments of the invention, the description is meant to encompass and specifically disclose all combinations of these embodiments unless specifically indicated otherwise or physically impossible.

The invention claimed is:

1. A kit of materials for forming an object by an additive fabrication process comprising:
   a. a particulate composition comprising a plurality of first particles that comprise:
      i. a resin component comprising a first resin, the first resin comprising a first resin polymerizable group, the first resin polymerizable group comprising a carbon-carbon double bond directly attached to an electron withdrawing group,
      ii. a thermal radical initiator having an activation temperature of greater than 40° C. dispersed or dissolved in the resin component, and
      iii. a retardant dispersed or dissolved in the resin component; and
   b. a liquid composition comprising:
      i. a first liquid polymerizable component, the first liquid polymerizable component comprising a first liquid polymerizable group, the first liquid polymerizable group comprising a carbon-carbon double bond that is able to (co)polymerize with the first resin polymerizable group.

2. The kit of materials of claim 1, wherein the activation temperature of the thermal radical initiator is greater than 50° C.

3. The kit of materials of claim 2, wherein the kit further comprises an accelerator for the thermal radical initiator.

4. The kit of materials of claim 3, wherein the accelerator comprises a transition metal catalyst.

5. The kit of materials of claim 4, wherein the transition metal catalyst comprises a transition metal salt or transition metal complex.

6. The kit of materials of claim 5, wherein the transition metal catalyst comprises Co, Mn, Cu, Fe, V, or Ti.

7. The kit of materials of claim 3, wherein the liquid composition further comprises a plasticizer.

8. The kit of materials of claim 7, wherein the plasticizer comprises a polyalkylene ether.

9. The kit of materials of claim 3, wherein the plurality of first particles further comprise a non-reactive polymer having a number average molecular weight of 1000 to 20,000 g/mol.

10. The kit of materials of claim 3, wherein the accelerator comprises an aromatic tertiary amine.

11. The kit of materials of claim 10, wherein the aromatic tertiary amine comprises diisopropanol-p-toluidine.

12. The kit of materials of claim 3, wherein the retardant comprises a phenolic compound.

13. The kit of materials of claim 12, wherein the retardant comprises 2-methyl hydroquinone or 2-t-butyl hydroquinone.

14. The kit of materials of claim 2, wherein the resin component further comprises a second resin.

15. The kit of materials of claim 14, wherein the first resin comprises a polyester (meth)acrylate, the first resin polymerizable group comprises a (meth)acrylate, and the first liquid polymerizable group comprises a (meth)acrylate.

16. The kit of materials of claim 14, wherein the first resin comprises an unsaturated polyester, and the first liquid polymerizable group is a vinyl ether.

17. The kit of materials of claim 14, wherein the first resin polymerizable group comprises an acrylate, the first liquid polymerizable group comprises a vinyl ether, and the second resin comprises a second resin polymerizable group.

18. The kit of materials of claim 17, wherein the first resin is not able to copolymerize with the second resin, and wherein the second resin polymerizable group comprises an epoxy.

19. The kit of materials of claim 18, wherein the first resin polymerizable group is a (meth)acrylate and the second resin polymerizable group comprises an epoxy or a fumarate.

20. The kit of materials of claim 18, wherein the second liquid polymerizable group comprises an acrylate, methacrylate, maleate, or itaconate.

* * * * *